United States Patent
Lu et al.

(10) Patent No.: US 12,517,478 B2
(45) Date of Patent: Jan. 6, 2026

(54) SYSTEMS, APPARATUSES, METHODS, AND COMPUTER PROGRAM PRODUCTS FOR CONSTRAINED EMISSIONS CONTROL, EMISSIONS OPTIMIZATION, AND EMISSIONS PLANNING

(71) Applicant: HONEYWELL INTERNATIONAL INC., Charlotte, NC (US)

(72) Inventors: Joseph Z. Lu, Glendale, AZ (US); Jeffrey Glen Renfro, Deer Park, TX (US); Joseph Steven Majewski, Huntington, NY (US); Ramdas Pai, Cary, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 402 days.

(21) Appl. No.: 18/172,421

(22) Filed: Feb. 22, 2023

(65) Prior Publication Data
US 2024/0280949 A1    Aug. 22, 2024

(51) Int. Cl.
*G05B 13/04* (2006.01)

(52) U.S. Cl.
CPC .................. *G05B 13/042* (2013.01)

(58) Field of Classification Search
CPC ........... G05B 13/042; G06Q 10/06313; G06Q 10/06375; G06Q 10/04
See application file for complete search history.

(56) References Cited

U.S. PATENT DOCUMENTS

2021/0334895 A1*  10/2021  Kumar ................... G06N 20/00
2023/0020417 A1*  1/2023   Elbsat .............. G06Q 10/06313
(Continued)

FOREIGN PATENT DOCUMENTS

EP   4254709 A1 * 10/2023 ........... H02J 15/008
JP   2022188870 A  * 12/2022

OTHER PUBLICATIONS

Chaoyang Zhang et al., "Big Data Analysis Approach for Real-Time Carbon Efficiency Evaluation of Discrete Manufacturing Workshops," IEEE Access, 7:107730-107743, (2019).
(Continued)

*Primary Examiner* — Mong-Shune Chung
(74) *Attorney, Agent, or Firm* — ALSTON & BIRD LLP

(57) ABSTRACT

Systems, apparatuses, methods, and computer program products for constrained emissions control, emissions optimization, and emissions planning are provided herein. In some embodiments, a computer-implemented method may include receiving operational data associated with one or more assets. In some embodiments, the operational data comprises short-term operational data and long-term operational data. In some embodiments, a computer-implemented method may include generating, based on applying the short-term operational data and the long-term operational data to an optimization model, a long-term emissions optimization plan. In some embodiments, a computer-implemented method may include generating, based at least on the long-term emissions optimization plan, a short-term emissions control. In some embodiments, a computer-implemented method may include initiating performance of one or more emissions optimization actions based at least in part on the long-term emissions optimization plan or the short-term emissions control.

20 Claims, 4 Drawing Sheets

(56) References Cited

U.S. PATENT DOCUMENTS

| | | | |
|---|---|---|---|
| 2023/0115876 A1* | 4/2023 | Avadhani | G06Q 50/06 |
| | | | 706/52 |
| 2023/0385299 A1* | 11/2023 | Al Rasheed | G06F 16/258 |
| 2024/0126222 A1* | 4/2024 | Kloepper | G05B 13/048 |
| 2024/0295863 A1* | 9/2024 | O'Nien | G06Q 10/06375 |

OTHER PUBLICATIONS

Extended European Search Report Mailed on Jun. 3, 2024 for EP Application No. 24158003, 9 page(s).

* cited by examiner

SYSTEMS, APPARATUSES, METHODS, AND COMPUTER PROGRAM PRODUCTS FOR CONSTRAINED EMISSIONS CONTROL, EMISSIONS OPTIMIZATION, AND EMISSIONS PLANNING

TECHNOLOGICAL FIELD

Embodiments of the present disclosure relate generally to systems, apparatuses, methods, and computer program products for constrained emissions control, emissions optimization, and emissions planning.

BACKGROUND

Applicant has identified many technical challenges and difficulties associated with systems, apparatuses, methods, and computer program products for constrained emissions control, emissions optimization, and emissions planning. Through applied effort, ingenuity, and innovation, Applicant has solved problems related to systems, apparatuses, methods, and computer program products for constrained emissions control, emissions optimization, and emissions planning by developing solutions embodied in the present disclosure, which are described in detail below.

BRIEF SUMMARY

Various embodiments described herein relate to systems, apparatuses, methods, and computer program products for constrained emissions control, emissions optimization, and emissions planning.

In accordance with one aspect of the disclosure, a computer-implemented method for constrained emissions control, emissions optimization, and emissions planning is provided. In some embodiments, the computer implemented may include receiving operational data associated with one or more assets. In some embodiments, the operational data comprises short-term operational data and long-term operational data. In some embodiments, a computer-implemented method may include generating, based at least in part on applying the short-term operational data and the long-term operational data to an optimization model, a long-term emissions optimization plan. In some embodiments, a computer-implemented method may include generating, based at least in part on the long-term emissions optimization plan, a short-term emissions control. In some embodiments, a computer-implemented method may include initiating performance of one or more emissions optimization actions based at least in part on the long-term emissions optimization plan or the short-term emissions control.

In some embodiments, the computer-implemented method may further include receiving updated operational data associated with one or more assets. In some embodiments, the updated operational data comprises updated short-term operational data and updated long-term operational data. In some embodiments, the computer-implemented method may further include generating, based at least in part on applying the updated short-term operational data and the updated long-term operational data to the optimization model, an adjusted long-term emissions optimization plan. In some embodiments, the computer-implemented method may further include generating, based at least in part on the adjusted long-term emissions optimization plan, an adjusted short-term emissions control. In some embodiments, the computer-implemented method may further include initiating performance of one or more adjusted emissions optimization actions based at least in part on the adjusted long-term emissions optimization plan or the adjusted short-term emissions control.

In some embodiments, updated operational data is received after the performance of the one or more emissions optimization actions.

In some embodiments, the long-term emissions optimization plan comprises a long-term emissions estimate and the short-term emissions control comprises a short-term emissions estimate.

In some embodiments, the adjusted long-term emissions optimization plan is based at least in part on one or more errors in the long-term emissions optimization plan.

In some embodiments, the adjusted short-term emissions control is based at least in part on the one or more errors in the long-term emissions estimate or the short-term emissions control.

In some embodiments, the one or more emissions optimization actions include at least one short-term emissions control optimization actions and at least one long-term emissions optimization actions.

In some embodiments, the at least one short-term emissions control optimization actions include control optimization actions that is implemented within a short-term time period and the at least one long-term emissions optimization actions includes optimization actions that is implemented within a long-term time period.

In some embodiments, the long-term time period is greater than the short-term time period.

In some embodiments, wherein the one or more assets include at least one building and at least one plant.

In some embodiments, the operational data is received in real-time.

In some embodiments, the optimization model comprises a statistical model, an algorithmic model, a control systems model, or a machine learning model.

In some embodiments, the optimization model utilizes model predictive control. In some embodiments, the optimization model utilizes proportional-integral-derivative control.

In accordance with another aspect of the disclosure, an apparatus for constrained emissions control, emissions optimization, and emissions planning is provided. In some embodiments, the apparatus may be caused to receive operational data associated with one or more assets. In some embodiments, the operational data comprises short-term operational data and long-term operational data. In some embodiments, the apparatus may be caused to generate, based at least in part on applying the short-term operational data and the long-term operational data to an optimization model, a long-term emissions optimization plan. In some embodiments, the apparatus may be caused to generate, based at least in part on the long-term emissions optimization plan, a short-term emissions control. In some embodiments, the apparatus may be caused to initiate performance of one or more emissions optimization actions based at least in part on the long-term emissions optimization plan or the short-term emissions control.

In some embodiments, the apparatus may be further configured to receive updated operational data associated with one or more assets. In some embodiments, the updated operational data comprises updated short-term operational data and updated long-term operational data. In some embodiments, the apparatus may be caused to generate, based at least in part on applying the updated short-term operational data and the updated long-term operational data to the optimization model, an adjusted long-term emissions optimization plan. In some embodiments, the apparatus may be caused to generate, based at least in part on the adjusted long-term emissions optimization plan, an adjusted short-term emissions control. In some embodiments, the apparatus may be caused to initiate performance of one or more adjusted emissions optimization actions based at least in part on the adjusted long-term emissions optimization plan or the adjusted short-term emissions control.

In some embodiments, updated operational data is received after the performance of the one or more emissions optimization actions.

In some embodiments, the long-term emissions optimization plan comprises a long-term emissions estimate and the short-term emissions control comprises a short-term emissions estimate.

In some embodiments, the adjusted long-term emissions optimization plan is based at least in part on one or more errors in the long-term emissions optimization plan.

In some embodiments, the adjusted short-term emissions control is based at least in part on the one or more errors in the long-term emissions estimate or the short-term emissions control.

In some embodiments, the one or more emissions optimization actions include at least one short-term emissions control optimization actions and at least one long-term emissions optimization actions.

In some embodiments, the at least one short-term emissions control optimization actions include control optimization actions that is implemented within a short-term time period and the at least one long-term emissions optimization actions includes optimization actions that is implemented within a long-term time period.

In some embodiments, the long-term time period is greater than the short-term time period.

In some embodiments, wherein the one or more assets include at least one building and at least one plant.

In some embodiments, the operational data is received in real-time.

In accordance with another aspect of the disclosure, a computer program product for constrained emissions control, emissions optimization, and emissions planning is provided. In some embodiments, the computer program product may be configured for receiving operational data associated with one or more assets. In some embodiments, the operational data comprises short-term operational data and long-term operational data. In some embodiments, the computer program product may be configured for generating, based at least in part on applying the short-term operational data and the long-term operational data to an optimization model, a long-term emissions optimization plan. In some embodiments, the computer program product may be configured for generating, based at least in part on the long-term emissions optimization plan, a short-term emissions control. In some embodiments, the computer program product may be configured for initiating performance of one or more emissions optimization actions based at least in part on the long-term emissions optimization plan or the short-term emissions control.

In some embodiments, the computer program product may be further configured for receiving updated operational data associated with one or more assets. In some embodiments, the updated operational data comprises updated short-term operational data and updated long-term operational data. In some embodiments, the computer program product may be further configured for generating, based at least in part on applying the updated short-term operational data and the updated long-term operational data to the optimization model, an adjusted long-term emissions optimization plan. In some embodiments, the computer program product may be further configured for generating, based at least in part on the adjusted long-term emissions optimization plan, an adjusted short-term emissions control. In some embodiments, the computer program product may be further configured for initiating performance of one or more adjusted emissions optimization actions based at least in part on the adjusted long-term emissions optimization plan or the adjusted short-term emissions control.

In some embodiments, updated operational data is received after the performance of the one or more emissions optimization actions.

In some embodiments, the long-term emissions optimization plan comprises a long-term emissions estimate and the short-term emissions control comprises a short-term emissions estimate.

In some embodiments, the adjusted long-term emissions optimization plan is based at least in part on one or more errors in the long-term emissions optimization plan.

In some embodiments, the adjusted short-term emissions control is based at least in part on the one or more errors in the long-term emissions estimate or the short-term emissions control.

In some embodiments, the one or more emissions optimization actions include at least one short-term emissions control optimization actions and at least one long-term emissions optimization actions.

In some embodiments, the at least one short-term emissions control optimization actions include control optimization actions that is implemented within a short-term time period and the at least one long-term emissions optimization actions includes optimization actions that is implemented within a long-term time period.

In some embodiments, the long-term time period is greater than the short-term time period.

In some embodiments, wherein the one or more assets include at least one building and at least one plant.

In some embodiments, the operational data is received in real-time.

In some embodiments, the optimization model comprises a statistical model, algorithmic model, control systems model, or machine learning model.

In some embodiments, the optimization model utilizes model predictive control. In some embodiments, the optimization model utilizes proportional-integral-derivative control.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
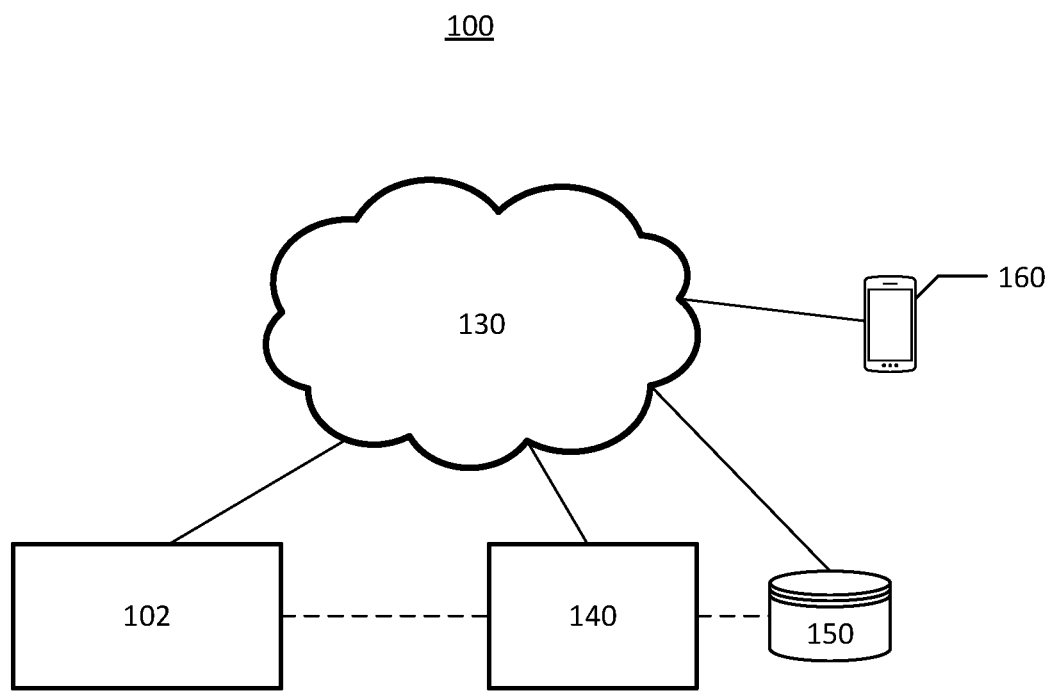
FIG. 1 illustrates an exemplary block diagram of an environment in which embodiments of the present disclosure may operate.

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of a system, or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry. Alternatively or additionally, in some embodiments, other elements of a system and/or apparatus described herein may provide or supplement the functionality of another particular set of circuitry. For example, a processor may provide processing functionality to any of the sets of circuitry, a memory may provide storage functionality to any of the sets of circuitry, communications circuitry may provide network interface functionality to any of the sets of circuitry, and/or the like.

As used herein, the term "operational data" refers to electronically managed data associated with the operations of one or more assets. As non-limiting examples, the operational data may include short-term operational data and/or long-term operational data.

As used herein, the term "short-term operational data" refers to electronically managed data associated with the operations of the one or more assets associated with a short-term time period.

As used herein, the term "short-term time period" refers to a time period associated with the current operations and/or near-term operations of one or more assets.

As used herein, the term "long-term operational data" refers to electronically managed data associated with the operations of the one or more assets associated with a long-term time period.

As used herein, the term "long-term time period" refers a time period associated with the future (e.g., planned) operations of the one or more assets.

As used herein, the term "optimization model" refers to one or more of a statistical model, an algorithmic model, a control systems model, first principles model, financial model, and/or a machine learning model that is configured to at least in part generate a long-term emissions optimization plan.

As used herein, the term "long-term emissions optimization plan" refers to electronically managed data that represents an emissions optimization plan for the one or more assets in the long-term time period. As non-limiting examples, the long-term emissions optimization plan may include a long-term emissions estimate representing an emissions estimate for the one or more assets for the long-term time period and/or long-term emissions optimization actions representing optimization actions that the one or assets may perform in the long-term time period.

As used herein, the term "short-term emissions control" refers to electronically managed data that represents emissions control for the one or more assets in the short-term time period. As non-limiting examples, the short-term emissions control may include a short-term emissions estimate representing an emissions estimate for the one or more assets for the short-term time period and/or short-term emissions control optimization actions representing control optimization actions that the one or assets may perform in the short-term time period.

Overview

Example embodiments disclosed herein address technical problems associated with systems, apparatuses, methods, and computer program products for constrained emissions control, emissions optimization, and emissions planning. As would be understood by one skilled in the field to which this disclosure pertains, there are numerous example scenarios in which a user may use systems, apparatuses, methods, and computer program products for constrained emissions control, emissions optimization, and emissions planning.

In many applications, systems, apparatuses, methods, and computer program products for constrained emissions control, emissions optimization, and emissions planning are necessary. For example, plants (e.g., industrial plants) and buildings account for approximately 60 percent of total carbon dioxide and/or other greenhouse gas emissions. In light of this, in some examples, many enterprises (e.g., global corporations that may own and/or operate numerous plants and/or buildings) have made sustainability commitments to their shareholders, customers, regulators, employees, and/or the public in which the enterprises have committed to achieving net zero emissions by a planned date (e.g., 2050 is a common net zero date set by enterprises). In order to achieve net zero emissions, enterprises have implemented emissions control, emissions plans, and emissions optimizations which implement actions, detail actions (e.g., upgrade a component to a more efficient component), and/or detail intermediate goals (e.g., reduce emissions by half by 2040) to achieve net zero emissions. As such, it is necessary for enterprises to regularly track their emissions to ensure that the enterprises are adhering to their emissions control, emissions plans, and emissions optimizations and will reach net zero emissions by their planned date.

Example solutions for constrained emissions control, emissions optimization, and emissions planning include, for example, an enterprise monitoring their current emissions and, if the enterprise's emissions are too high (e.g., according to the enterprise's emissions control, emissions plans, and emissions optimizations), reducing the enterprise's emissions, such as by reducing operating hours of a plant owned by the enterprise. However, such monitoring and, in response to the monitoring, reducing approaches have several drawbacks. For example, such approaches fail to account for how the current and/or near-term operations of the enterprise impact the future (or planned) operations of the enterprise and vice versa. In this regard, for example, monitoring may indicate that the current emissions of the enterprise are currently high and, in response to this, the current emissions of the enterprise may be reduced (e.g., by reducing the operating hours of a plant owned by the enterprise, which may in turn impact the enterprise's revenue). However, such an approach may fail to consider that in the future, the enterprise will take an action (e.g., replacing a coal plant with a wind plant) that will reduce the enterprise's emissions by a large amount. As a result, even if the monitoring indicates that the current emissions are high, the enterprise may still be able to reach net zero emissions by their planned date without reducing the current emissions of the enterprise. Accordingly, such approaches are unable to achieve net zero emissions by their planned date in an efficient and cost-effective manner.

As another example, such an approach fails to provide and/or consider feedback on the success of previous actions to reduce emissions in accordance with the emissions control, emissions plans, and emissions optimizations. In this regard, for example, monitoring may indicate that the current emissions of the enterprise are currently high and, in response to this, action may be taken to reduce the current emissions of the enterprise by a particular amount. However, such predictions may not adequately evaluate whether the action to reduce emissions was actually successful, whether due to inaccuracy of current prediction methodologies and/or impacts of unforeseen influences. That is, such approaches are often unable to determine whether the emissions of the enterprise were actually reduced by the particular amount. Accordingly, such approaches result in an enterprise being unable to ensure that the enterprise is properly adhering to their emissions control, emissions plans, and emissions optimizations to achieve net zero emissions by their planned date in an efficient and cost-effective manner.

Thus, to address these and/or other issues related to systems, apparatuses, methods, and computer program products for constrained emissions control, emissions optimization, and emissions planning, example systems, apparatuses, methods, and computer program product for constrained emissions control, emissions optimization, and emissions planning are disclosed herein. For example, an embodiment in this disclosure, described in greater detail below, includes receiving operational data associated with one or more assets. In some embodiments, the operational data may include short-term operational data and long-term operational data. In some embodiments, an embodiment in this disclosure, described in greater detail below, includes generating, based on applying the short-term operational data and the long-term operational data to an optimization model, a long-term emissions optimization plan. In some embodiments, an embodiment in this disclosure, described in greater detail below, includes generating, based at least on the long-term emissions optimization plan, a short-term emissions control. In some embodiments, an embodiment in this disclosure, described in greater detail below, includes initiating performance of one or more emissions optimization actions based at least in part on the long-term emissions optimization plan or the short-term emissions control.

An embodiment in this disclosure, described in greater detail below, after the performance of the one or more emissions optimization actions, includes receiving updated operational data associated with one or more assets. In some embodiments, the updated operational data comprises updated short-term operational data and updated long-term operational data. An embodiment in this disclosure, described in greater detail below, includes generating, based on applying the updated short-term operational data and the updated long-term operational data to the optimization model, an adjusted long-term emissions optimization plan. An embodiment in this disclosure, described in greater detail below, includes generating, based at least on the adjusted long-term emissions optimization plan, an adjusted short-term emissions control. An embodiment in this disclosure, described in greater detail below, includes initiating performance of one or more adjusted emissions optimization actions based at least in part on the adjusted long-term emissions optimization plan or the adjusted short-term emissions control. In some embodiments, the adjusted long-term emissions optimization plan is based at least in part on one or more errors in the long-term emissions optimization plan. In some embodiments, the adjusted short-term emissions control is based at least in part on one or more errors in the short-term emissions estimate. Accordingly, embodiments in this disclosure, described in greater detail below, enable an enterprise to perform constrained emissions control, emissions optimization, and emissions planning that accounts for how the current and/or near-term operations of the enterprise impact the future (or planned) operations of the enterprise and vice versa as well as incorporates feedback related to the success of previous actions that impacted the emissions of the enterprise.

Example Systems and Apparatuses

Embodiments of the present disclosure herein include systems, apparatuses, methods, and computer program products configured for and to perform one or more operations for constrained emissions control, emissions optimization, and emissions planning. It should be readily appreciated that the embodiments of the apparatus, systems, methods, and computer program product described herein may be configured in various additional and alternative manners in addition to those expressly described herein.

FIG. 1 illustrates an exemplary block diagram of an environment 100 in which embodiments of the present disclosure may operate. Specifically, FIG. 1 illustrates one or more assets 102. In some embodiments, for example, the one or more assets 102 may be any type of facility associated with a user associated with the environment 100. For example, the one or more assets 102 may include at least one plant. In this regard, the one or more assets 102 may, for example, be a processing plant that receives and processes ingredients as inputs to create a final product, such as a hydrocarbon processing plant, a refinery plant, a drilling plant, a fracking plant, and/or the like. Additionally or alternatively, for example, the one or more assets 102 may include at least one building. In this regard, the one or more assets 102 may, for example, be an industrial building, office building, building associated with a plant, and/or the like.

In some embodiments, the one or more assets 102 may be associated with an emissions amount. For example, the emissions amount of the one or more assets 102 may include emissions (e.g., carbon dioxide, greenhouse gasses, etc.) generated by and/or will be generated by the one or more assets 102 that are released by the one or more assets 102 into the atmosphere (e.g., a hydrocarbon processing plant may vent carbon dioxide). As another example, the emissions amount of the one or more assets 102 may include emissions associated with power that is consumed and/or will be consumed by the one or more assets 102 (e.g., a building may consume power generated by a natural gas plant that releases emissions). As another example, the emissions amount of the one or more assets 102 may include emissions associated with raw materials used by and/or will be used by the one or more assets 102 (e.g., a building may be constructed out of steel, or a plant may consume fuel to operate). In some embodiments, the one or more assets 102 may be associated with a net zero emissions date. In this regard, the net zero emissions date may be a date when the one or more assets 102 are planning to have net zero carbon dioxide emissions and/or greenhouse gas emissions.

The one or more assets 102 in some embodiments includes any number of individual components. The components of the one or more assets 102 may perform a particular function during operation of the one or more assets 102. For example, in the example context of a plant (e.g., a hydrocarbon processing plant, a refinery plant, a drilling plant, a fracking plant, and/or the like) embodying the one or more assets 102, the components may include one or more well components, fracking components, crude processing components, hydrotreating components, isomerization components, vapor recovery components, catalytic cracking components, aromatics reduction components, visbreaker components, storage tank components, blender components, pump components, flash venting components, compressor components, cooler components (e.g., air cooler components), sensor components, flare components, heating, ventilation, and air (HVAC) components, lighting components, and/or the like that perform a particular operation for transforming, storing, releasing, and/or otherwise handling one or more input ingredient(s) (e.g., hydrocarbons, gases, etc.). In this regard, for example, the individual components of a plant may include components associated with a particular process performed by the plant (e.g., hydrocarbon processing) and/or components not associated with a particular process performed by the plant (e.g., a HVAC component associated with the plant, but is not used to perform hydrocarbon processing). As another example, in the example context of a building (e.g., an industrial building, office building, building associated with a plant, and/or the like) embodying the one or more assets 102, the components may include one or more cooler components (e.g., air cooler components), heating components, fan components, power supply components, construction material components, HVAC components, lighting components, and/or the like.

In some embodiments, each individual component of the one or more assets 102 is associated with a determinable location. The determinable location of a particular component in some embodiments represents an absolute position (e.g., GPS coordinates, latitude, and longitude locations, and/or the like) or a relative position (e.g., a point representation of the location of a component from a local origin point corresponding to the one or more assets 102). In some embodiments, a component includes or otherwise is associated with a location sensor and/or software-driven location services that provide the location data representing the location corresponding to that component. In other embodiments the location of a component is stored and/or otherwise predetermined within a software environment, provided by a user and/or otherwise determinable to one or more systems.

Additionally or alternatively, in some embodiments, the one or more assets 102 itself is associated with a determinable location. The determinable location of the one or more assets 102 in some embodiments represents an absolute position (e.g., GPS coordinates, latitude and longitude locations, an address, and/or the like) or a relative position of the one or more assets 102 (e.g., an identifier representing the location of the one or more assets 102 as compared to one or more other assets, an enterprise headquarters, or general description in the world for example based at least in part on continent, state, or other definable region). In some embodiments, the one or more assets 102 includes or otherwise is associated with a location sensor and/or software-driven location services that provide the location data corresponding to the one or more assets 102. In other embodiments, the location of the one or more assets 102 is stored and/or otherwise determinable to one or more systems.

The network 130 may be embodied in any of a myriad of network configurations. In some embodiments, the network 130 may be a public network (e.g., the Internet). In some embodiments, the network 130 may be a private a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

In some embodiments, the environment 100 may include an emissions system 140. In some embodiments, for example, the emissions system 140 may be configured to constrained emissions control, emissions optimization, and emissions planning. The emissions system 140 may be electronically and/or communicatively coupled to the one or more assets 102, individual components of the one or more assets, one or more databases 150, and/or one or more user devices 160. The emissions system 140 may be located remotely, in proximity of, and/or within a particular asset of the one or more assets 102. In some embodiments, the emissions system 140 is configured via hardware, software, firmware, and/or a combination thereof, to perform data intake of one or more types of data associated with one or more of the one or more assets 102. Additionally or alternatively, in some embodiments, the emissions system 140 is configured via hardware, software, firmware, and/or a combination thereof, to generate and/or transmit command(s) that control, adjust, or otherwise impact operations of one or more of the one or more assets 102 or specific component(s) thereof, for example for controlling one or more operations of the one or more assets 102. Additionally or alternatively still, in some embodiments, the emissions system 140 is configured via hardware, software, firmware, and/or a combination thereof, to perform data reporting and/or other data output process(es) associated with monitoring or otherwise analyzing operations of one or more of the one or more assets 102 or specific component(s) thereof, for example for generating and/or outputting report(s) corresponding to the operations performed via the one or more assets 102. For example, in various embodiments, the emissions system 140 may be configured to execute and/or perform one or more operations and/or functions described herein.

The one or more databases 150 may be configured to receive, store, and/or transmit data. In some embodiments, the one or more databases 150 may be associated with operational data associated with the one or more assets 102. In some embodiments, the operational data associated with the one or more assets 102 may include short-term operational data and/or long-term operational data. In some embodiments, the operational data may be received from the one or more assets 102. In this regard, for example, the one or more assets 102 may have one or more sensors that capture operational data and/or one or more datastores that store operational data. In some embodiments, the one or more databases 150 may be associated with operational data received from the one or more assets 102 in real-time. Additionally or alternatively, the one or more databases 150 may be associated with operational data received from the one or more assets 102 on a periodic basis (e.g., the operational data may be received from the one or more assets 102 once per day). Additionally or alternatively, the one or more databases 150 may be associated with historical operational data received from the one or more assets 102 (e.g., operational data previously received from the one or more assets 102). In this regard, the one or more databases 150 may include one or more historical operational data datasets. Additionally or alternatively, the one or more databases 150 may be associated with operational data received from the one or more assets 102 after the emissions system 140 has requested operational data from the one or more assets 102. Additionally or alternatively, the one or more databases 150 may be associated with operational data inputted (e.g., by a user) into the emissions system 140 and/or the one or more user devices 160.

The one or more user devices 160 may be associated with users of the emissions system 140. In various embodiments, the emissions system 140 may generate and/or transmit a message, alert, or indication to a user via a user device 160. Additionally, or alternatively, a user device 160 may be utilized by a user to remotely access an emissions system 140. This may be by, for example, an application operating on the user device 160. A user may access the emissions system 140 remotely, including one or more visualizations, reports, and/or real-time displays.

Additionally, while FIG. 1 illustrates certain components as separate, standalone entities communicating over the network 130, various embodiments are not limited to this configuration. In other embodiments, one or more components may be directly connected and/or share hardware or the like. For example, in some embodiments, the emissions system 140 may include one or more databases 150, which may collectively be located in or at the one or more assets 102.

Figure 2:
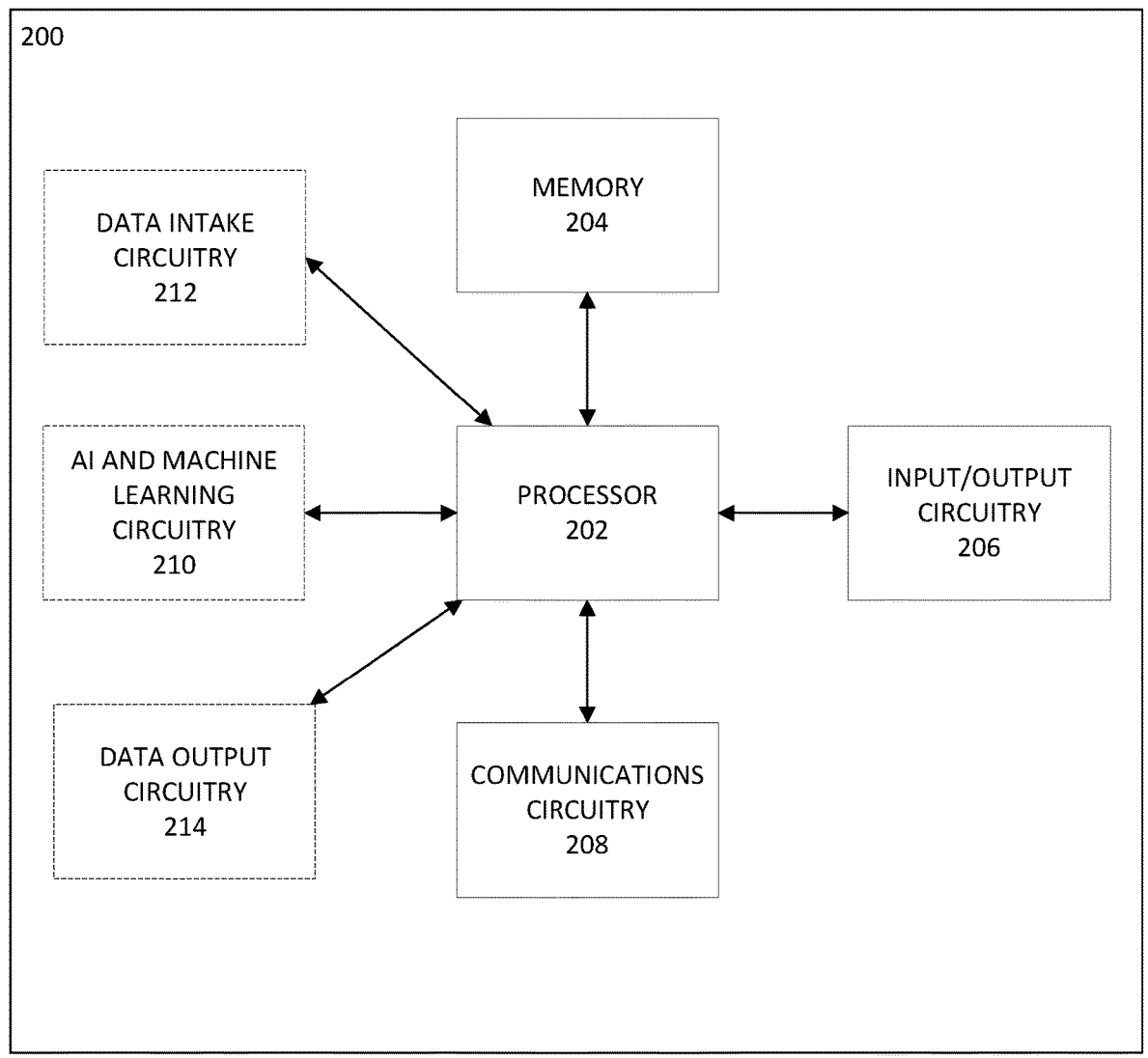
FIG. 2 illustrates an exemplary block diagram of an example apparatus that may be specially configured in accordance with an example embodiment of the present disclosure.

FIG. 2 illustrates an exemplary block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. For example, the computing apparatus 200 may be embodied as one or more of a specifically configured personal computing apparatus, a specifically configured cloud based computing apparatus, a specifically configured embedded computing device (e.g., configured for edge computing, and/or the like. Examples of an apparatus 200 may include, but is not limited to, an emissions system 140, a database 150, and/or a user device 160. The apparatus 200 includes processor 202, memory 204, input/output circuitry 206, communications circuitry 208, and/or optional artificial intelligence ("AI") and machine learning circuitry 210. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, such as computing apparatus 200 of an emissions system 140 or of a user device 160 may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuity 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or coprocessor or any other processing circuitry assisting or otherwise associated with the processor) is/are in communication with the memory 204 via a bus for passing information among components of the apparatus 200.

Memory 204 or memory circuitry 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a computing device and/or other display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally or alternatively, the communications circuitry 208 may include one or more network interface card(s), antenna (s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna (s). In some embodiments, the communications circuitry 208 enables transmission to and/or receipt of data from a user device, one or more sensors, and/or other external computing device(s) in communication with the apparatus 200.

Data intake circuitry 212 may be included in the apparatus 200. The data intake circuitry 212 may include hardware, software, firmware, and/or a combination thereof, designed and/or configured to capture, receive, request, and/or otherwise gather data associated with operations of the one or more assets 102. In some embodiments, the data intake circuitry 212 includes hardware, software, firmware, and/or a combination thereof, that communicates with one or more sensor(s) component(s), and/or the like within the one or more assets 102 to receive particular data associated with such operations of the one or more assets 102. The data intake circuitry 212 may support such operations for any number of individual assets 102. Additionally or alternatively, in some embodiments, the data intake circuitry 212 includes hardware, software, firmware, and/or a combination thereof, that retrieves particular data associated with one or more of the one or more assets 102 from one or more data repository/repositories accessible to the apparatus 200.

AI and machine learning circuitry 210 may be included in the apparatus 200. The AI and machine learning circuitry 210 may include hardware, software, firmware, and/or a combination thereof designed and/or configured to request, receive, process, generate, and transmit data, data structures, control signals, and electronic information for training and executing a trained AI and machine learning model configured to facilitating the operations and/or functionalities described herein. For example, in some embodiments the AI and machine learning circuitry 210 includes hardware, software, firmware, and/or a combination thereof, that identifies training data and/or utilizes such training data for training a particular machine learning model, AI, and/or other model to generate particular output data based at least in part on learnings from the training data. Additionally or alternatively, in some embodiments, the AI and machine learning circuitry 210 includes hardware, software, firmware, and/or a combination thereof, that embodies or retrieves a trained machine learning model, AI and/or other specially configured model utilized to process inputted data. Additionally or alternatively, in some embodiments, the AI and machine learning circuitry 210 includes hardware, software, firmware, and/or a combination thereof that processes received data utilizing one or more algorithm(s), function(s), subroutine(s), and/or the like, in one or more pre-processing and/or subsequent operations that need not utilize a machine learning or AI model.

Data output circuitry 214 may be included in the apparatus 200. The data output circuitry 214 may include hardware, software, firmware, and/or a combination thereof, that configures and/or generates an output based at least in part on data processed by the apparatus 200. In some embodiments, the data output circuitry 214 includes hardware, software, firmware, and/or a combination thereof, that generates a particular report based at least in part on the processed data, for example where the report is generated based at least in part on a particular reporting protocol. Additionally or alternatively, in some embodiments, the data output circuitry 214 includes hardware, software, firmware, and/or a combination thereof, that configures a particular output data object, output data file, and/or user interface for storing, transmitting, and/or displaying. For example, in some embodiments, the data output circuitry 214 generates and/or specially configures a particular data output for transmission to another system sub-system for further processing. Additionally or alternatively, in some embodiments, the data output circuitry 214 includes hardware, software, firmware, and/or a combination thereof, that causes rendering of a specially configured user interface based at least in part on data received by and/or processing by the apparatus 200.

In some embodiments, two or more of the sets of circuitries 202-214 are combinable. Alternatively, or additionally, one or more of the sets of circuitry 202-214 perform some or all of the operations and/or functionality described herein as being associated with another circuitry. In some embodiments, two or more of the sets of circuitry 202-214 are combined into a single module embodied in hardware, software, firmware, and/or a combination thereof. For example, in some embodiments, one or more of the sets of circuitry, for example the AI and machine learning circuitry 210, may be combined with the processor 202, such that the processor 202 performs one or more of the operations described herein with respect the AI and machine learning circuitry 210.

Figure 3:
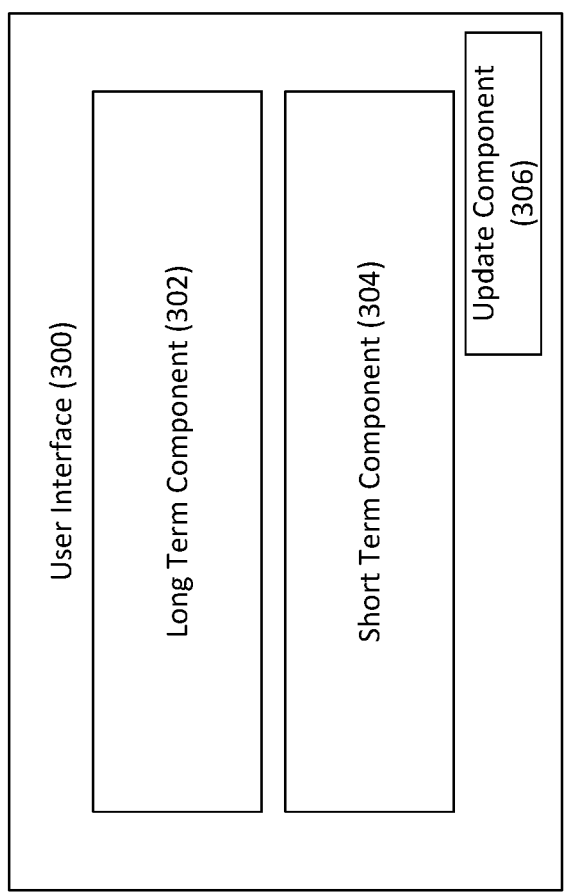
FIG. 3 illustrates an example user interface in accordance with one or more embodiments of the present disclosure.

With reference to FIGS. 1-3, in some embodiments, the emissions system 140 and/or the user device 160 may be configured to perform emissions planning (e.g., emissions planning to ensure the one or more assets 102 achieve net zero emissions by a planned net zero date). In this regard, the emissions system 140 and/or the user device 160 may be configured to receive operational data associated with the one or more assets 102. The operational data associated with the one or more assets 102 may include short-term operational data and/or long-term operational data.

In some embodiments, the short-term operational data may include data associated with the operations of the one or more assets 102 associated with a short-term time period. Said differently, the short-term time period may be a time period associated with the current operations and/or near-term operations of the one or more assets 102. For example, the short-term time period may refer to the operations of the one or more assets on the current hour, day, week, month, year, and/or the like and/or next hour, day, week, month, year, and/or the like. In some embodiments, the long-term operational data may include data associated with the operations of the one or more assets 102 associated with a long-term time period. For example, the long-term time period may refer to the operations of the one or more assets 102 on a future hour, day, week, month, year, etc. In this regard, for example, the long-term time period may include a time period that includes up to a net zero emissions date for the one or more assets 102. Said differently, the long-term time period may be a time period associated with the future (e.g., planned) operations of the one or more assets 102 in the long-term time period (e.g., a time period other than the short-term time period) while the short-term time period may be a time period associated with the current operations and/or near-term operations of the one or more assets 102 (e.g., a time period other than the long-term time period).

In some embodiments, short-term operational data may include the short-term emissions data, short-term asset type data, short-term asset number data, short-term asset component data, short-term asset component configuration data, short-term power consumption data, short-term power source type data, short-term supplier data, short-term financial data, and/or the like.

In some embodiments, for example, short-term emissions data may indicate an emissions amount associated with the current and/or near-term operations of the one or more assets 102. As another example, short-term asset type data may indicate the current and/or near-term type of assets, such as plants or buildings, included in the one or more assets 102. As another example, short-term asset number data may indicate the current and/or near-term number of assets (e.g., 3 buildings and 6 plants) included in the one or more assets 102. As another example, the short-term asset component data may indicate the current and/or near-term type of components included in the one or more assets 102 (e.g., a plant in the one or more assets 102 may include a crude processing component and/or a building in the one or more assets 102 may include a heating component). As another example, the short-term asset component configuration data may indicate the current and/or near-term configuration settings of the components in the one or more assets 102 (e.g., the configuration settings of a crude processing component of a plant in the one or more assets 102 and/or the configuration settings of a heating component of a building in the one or more assets 102). As another example, the short-term power consumption data may indicate current and/or near-term time periods when the one or more assets consumes power and/or current and/or near-term amount of power the one or more assets 102 consumes. As another example, the short-term power source type data may indicate the current and/or near-term power sources used by the one or more assets 102 (e.g., a building obtains at least some of its power from a natural gas-based power source). As another example, short-term supplier data may indicate the current and/or near-term suppliers of materials used by the one or more assets 102. As another example, short-term financial data may indicate the current and/or near-term financial aspects of operating the one or more assets 102, such as electricity costs, fuel costs (e.g., cost of hydrogen), material costs, taxes, amortization, depreciation, capital costs, and/or the like.

In some embodiments, the long-term operational data may include long-term emissions data, long-term net zero emissions date data, long-term asset type data, long-term asset number data, long-term asset component configuration data, long-term asset component replacement data, long-term asset component removal data, long-term power source type data, long-term supplier data, long-term financial data, and/or the like.

In some embodiments, for example, long-term emissions data may indicate an emissions amount associated with the planned future operations of the one or more assets 102. As another example, long-term net zero net zero emissions date data may indicate a date on which the one or more assets are planning to achieve net zero emissions. As another example, long-term asset type data may indicate the type of assets, such as plants or buildings, that are planned to be in the one or more assets 102 in the future. As another example, long-term asset number data may indicate the number of assets (e.g., 3 buildings and 6 plants) that are planned to be in the one or more assets 102 in the future. As another example, the long-term asset component data may indicate the type of components that are planned to be included in the one or more assets 102 in the future (e.g., a plant in the one or more assets 102 may plan to add a crude processing component in the future and/or a building in the one or more assets 102 may include adding a heating component in the future). As another example, the long-term asset component configuration data may indicate the planned configuration settings of the components in the one or more assets 102 in the future (e.g., the planned configuration settings of a crude processing component of a plant in the one or more assets 102 in the future and/or the planned configuration settings of a heating component of a building in the one or more assets 102 in the future). As another example, the long-term asset component replacement data may indicate the planned future replacement of components in the one or more assets 102 (e.g., a plant in the one or more assets 102 may plan to replace a crude processing component with a more efficient crude processing component in the future and/or a building in the one or more assets 102 may plan to replace a heating component with a more efficient heating component in the future). As another example, the long-term asset component removal data may indicate the planned future removal of components in the one or more assets 102 (e.g., a plant in the one or more assets 102 may plan to remove a crude processing component in the future and/or a building in the one or more assets 102 may plan to remove a heating component in the future). As another example, the long-term power consumption data may indicate future periods when the one or more assets consumes power and/or future amount of power the one or more assets 102 consumes. As another example, the long-term power source type data may indicate the planned future power sources used by the one or more assets 102 (e.g., a building plants to obtain at least some of its power from a natural gas-based power source in the future). As another example, long-term supplier data may indicate the suppliers of materials planned to be used by the one or more assets 102 in the future. As another example, long-term financial data may indicate the planned future financial aspects of operating the one or more assets 102, such as electricity costs, fuel costs (e.g., cost of hydrogen), material costs, taxes, amortization, depreciation, capital costs, and/or the like.

In some embodiments, at least some of the one or more assets 102 may only be associated with some of the short-term operational data. Additionally or alternatively, at least some of the one or more assets 102 may only be associated with some of the long-term operational data. In some embodiments, the short-term operational data and the long-term operational data may be mutually exclusive. That is, in some embodiments, the short-term operational data and the long-term operational data may not include any of the same data. In some embodiments, the short-term operational data and the long-term operational data may not be mutually exclusive. That is, in some embodiments, the short-term operational data and the long-term operational data may include at least some of the same data.

In some embodiments, the emissions system 140 and/or the user device 160 may be configured to generate a long-term emissions optimization plan. In some embodiments, the long-term emissions optimization plan may be generated based on applying the short-term operational data and/or the long-term operational data to an optimization model. In some embodiments, the optimization model may comprise one or more of a statistical model, an algorithmic model, a control systems model, first principles model, financial model, and/or a machine learning model (e.g., using AI and machine learning circuitry 210). For example, the optimization model may utilize model predictive control and/or proportional-integral-derivative control. As another example, the optimization model may implement supervised machine learning (e.g., regression) and/or unsupervised machine learning (e.g., clustering).

In some embodiments, the long-term emissions optimization plan may include a long-term emissions estimate. In this regard, the long-term emissions estimate may include an emissions estimate for the one or more assets 102 for the long-term time period. For example, the long-term emissions estimate may include an emissions estimate for each future year for the one or more assets 102. In this regard, for example, the long-term emissions estimate may include an emissions estimate for the net zero emissions date associated with the one or more assets 102.

In some embodiments, the long-term emissions optimization plan may indicate that the one or more assets 102 are on track to achieve net zero emissions by the net zero emissions date associated with the one or more assets 102. For example, the long-term emissions estimate may indicate that the one or more assets 102 will have net zero emissions at the net zero emissions date. In some embodiments, the long-term emissions optimization plan may indicate that the one or more assets 102 are on track to achieve net zero emissions after the net zero emissions date associated with the one or more assets 102. For example, the long-term emissions estimate may indicate that the one or more assets 102 will have greater than net zero emissions at the net zero emissions date. In some embodiments, the long-term emissions optimization plan may indicate that the one or more assets 102 are on track to achieve net zero emissions before the net zero emissions date associated with the one or more assets 102. For example, the long-term emissions estimate may indicate that the one or more assets 102 will have net zero emissions before the net zero emissions date.

In some embodiments, the long-term emissions optimization plan may include one or more long-term emissions optimization actions. In this regard, the long-term emissions optimization actions may include optimization actions that can be performed by the one or more assets 102 in the long-term time period.

In some embodiments, if the long-term emissions optimization plan indicates that the one or more assets 102 are on track to achieve net zero emissions by the net zero emissions date associated with the one or more assets 102, then the long-term emissions optimization plan may include long-term emissions optimization actions configured to cause the one or more assets 102 remain on track to achieve net zero emissions by the net zero emissions date associated with the one or more assets 102. In this regard, for example, if the one or more assets 102 was planning to replace a component of the one or more assets 102 with a more efficient component in 5 years, the long-term emissions optimization plan may include a long-term emissions optimization action instructing one or more of the one or more assets 102 to proceed with the replacement of the component of the one or more assets 102 with the more efficient component in 5 years.

In some embodiments, if the long-term emissions optimization plan indicates that the one or more assets 102 are on track to achieve net zero emissions after the net zero emissions date associated with the one or more assets 102, then the long-term emissions optimization plan may include long-term emissions optimization actions configured to cause the one or more assets 102 get back on track to achieve net zero emissions by the net zero emissions date associated with the one or more assets 102. In this regard, for example, if the one or more assets 102 was planning to replace a component of the one or more assets 102 with a more efficient component in 5 years, the long-term emissions optimization plan may include a long-term emissions optimization action instructing one or more of the one or more assets 102 to replace the component of the one or more assets 102 with the more efficient component in 3 years instead of 5 years.

In some embodiments, if the long-term emissions optimization plan indicates that the one or more assets 102 are on track to achieve net zero emissions before the net zero emissions date associated with the one or more assets 102, then the long-term emissions optimization plan may include long-term emissions optimization actions configured to cause the one or more assets 102 remain on track to achieve net zero emissions before the net zero emissions date associated with the one or more assets 102. In this regard, for example, if the one or more assets 102 was planning to replace a component of the one or more assets 102 with a more efficient component in 5 years, the long-term emissions optimization plan may include a long-term emissions optimization action instructing one or more of the one or more assets 102 to proceed with the replacement of the component of the one or more assets 102 with the more efficient component in 5 years.

In some embodiments, if the long-term emissions optimization plan indicates that the one or more assets 102 are on track to achieve net zero emissions before the net zero emissions date associated with the one or more assets 102, then the long-term emissions optimization plan may include long-term emissions optimization actions configured to cause the one or more assets 102 change track to achieve net zero emissions by the net zero emissions date associated with the one or more assets 102. In this regard, for example, if the one or more assets 102 was planning to replace a component of the one or more assets 102 with a more efficient component in 5 years, the long-term emissions optimization plan may include a long-term emissions optimization action instructing one or more of the one or more assets to replace the component of the one or more assets 102 with the more efficient component in 7 years instead of 5 years. In this regard, for example, the one or more assets may be able to reduce costs (e.g., such that one or more assets 102 can satisfy shareholders by increasing profits) while still achieving net zero emissions by the net zero emissions date associated with the one or more assets 102.

In some embodiments, the emissions system 140 and/or the user device 160 may be configured to generate a short-term emissions control. In some embodiments, the short-term emissions control may include a short-term emissions estimate. In this regard, the short-term emissions estimate may include an emissions estimate for the one or more assets 102 for the short-term time period. For example, the short-term emissions estimate may include an emissions estimate for the current day, week, month, year, and/or the like and/or the near-term day, week, month, year, and/or the like for the one or more assets 102 (e.g., whatever the short-term time period is).

In some embodiments, the short-term emissions control may be generated based at least in part on the long-term emissions optimization plan. For example, in order for the one or more assets 102 to achieve net zero emissions by the net zero emissions date associated with the one or more assets 102 in accordance with the long-term emissions optimization plan, the one or more assets 102 may need to adhere to a short-term emissions control that results in a particular emissions amount for the one or more assets 102 in the short-term time period. As another example, in accordance with the long-term emissions optimization plan, the one or more assets 102 may be implementing a long-term emissions optimization action, such as replacing a component of the one or more assets 102 with a more efficient component, in the long-term time period that will make a large difference in an emissions amount of the one or more assets 102 (e.g., in the long-term time period). As such, it may only be necessary for the one or more assets 102 to make no changes or only minor changes in the emissions amount of the one or more assets 102 in the short-term time period, which may reduce costs for the one or more assets 102 in the short-term time period (e.g., the one or more assets 102 may be able to use a component configuration setting that is cheaper but has a higher emissions amount than another component configuration setting). Said differently, as an example, the one or more assets 102 may be able to achieve net zero emissions by the net zero emissions date associated with the one or more assets by making no changes or only minor changes in the emissions amount of the one or more assets 102 in the short-term time period because the long-term emissions optimization plan may include one or more long-term emissions optimization actions that cause a large difference in the emissions amount in the long-term that accounts for (e.g., makes up for) the one or more assets making no changes or only minor changes in the emissions amount of the one or more assets 102 in the short-term time period.

In some embodiments, the short-term emissions control may include one or more short-term emissions control optimization actions. In this regard, the short-term emissions control optimization actions may include control optimization actions that can be performed by the one or more assets 102 in the short-term time period.

In some embodiments, the short-term emissions control may indicate that that the short-term emissions estimate is greater than the particular emissions amount necessary for the short-term time period in order for the one or more assets 102 to achieve net zero emissions by the net zero emissions date associated with the one or more assets 102 in accordance with the long-term emissions optimization plan. In this regard, the short-term emissions control may include one or more short-term emissions control optimization actions configured to cause the one or more assets 102 to reduce emissions such that the one or more assets 102 can meet the particular emissions amount necessary for the short-term time period in order for the one or more assets 102 to achieve net zero emissions by the net zero emissions date associated with the one or more assets 102. For example, the short-term emissions control may include a short-term emissions control optimization action instructing one or more of the one or more assets 102 to switch to a different power supply type of the one or more assets 102 (e.g., switch from a natural gas power supply to a wind power supply).

In some embodiments, the short-term emissions control may indicate that that the short-term emissions estimate is less than the particular emissions amount necessary for the short-term time period in order for the one or more assets 102 to achieve net zero emissions by the net zero emissions date associated with the one or more assets 102 in accordance with the long-term emissions optimization plan. In this regard, the short-term emissions control may include one or more short-term emissions control optimization actions configured to cause the one or more assets 102 increase emissions such that the one or more assets 102 can meet the particular emissions amount necessary for the short-term time period in order for the one or more assets 102 to achieve net zero emissions by the net zero emissions date associated with the one or more assets 102 while potentially reducing costs associated with operating the one or more assets 102. For example, the short-term emissions control may include a short-term emissions control optimization action instructing one or more of the one or more assets 102 to switch to a different power supply type of the one or more assets 102 (e.g., switch from a more expensive solar power supply to a cheaper natural gas power supply).

In some embodiments, the short-term emissions control may indicate that that the short-term emissions estimate is less than the particular emissions amount necessary for the short-term time period in order for the one or more assets 102 to achieve net zero emissions by the net zero emissions date associated with the one or more assets 102 in accordance with the long-term emissions optimization plan. In this regard, the short-term emissions control may include one or more short-term emissions control optimization actions configured to cause the one or more assets 102 to make no changes in emissions such that the one or more assets 102 can meet the particular emissions amount necessary for the short-term time period in order for the one or more assets 102 to achieve net zero emissions by the net zero emissions date associated with the one or more assets 102. For example, the short-term emissions control may include a short-term emissions control optimization action instructing one or more of the one or more assets 102 to make no changes to the power supply type of the one or more assets (e.g., continue to use natural gas power supply).

In some embodiments, the short-term emissions control may indicate that that the short-term emissions estimate is approximately equal to the particular emissions amount necessary for the short-term time period in order for the one or more assets 102 to achieve net zero emissions by the net zero emissions date associated with the one or more assets 102 in accordance with the long-term emissions optimization plan. In this regard, the short-term emissions control may include one or more short-term emissions control optimization actions configured to cause the one or more assets 102 to make no changes in emissions such that the one or more assets 102 can meet the particular emissions amount necessary for the short-term time period in order for the one or more assets 102 to achieve net zero emissions by the net zero emissions date associated with the one or more assets 102. For example, the short-term emissions control may include a short-term emissions control optimization action instructing one or more of the one or more assets 102 to make no changes to the power supply type of the one or more assets (e.g., continue to use natural gas power supply).

In some embodiments, the emissions system 140 and/or the user device 160 may be configured to initiate the performance of one or more emissions optimization actions. In some embodiments, initiating the performance of one or more emissions optimization actions may be based at least in part on the long-term emissions optimization plan and/or the short-term emissions control. In this regard, the one or more emissions optimization actions may include one or more long-term emissions optimization actions and/or one or more short-term emissions control optimization actions. For example, initiating the performance of one or more emissions optimization actions may include, transmitting an instruction to the one or more assets 102 to perform one or more long-term emissions optimization actions and/or one or more short-term emissions control optimization actions.

As another example, initiating the performance of one or more emissions optimization actions may include scheduling the replacement of a component of the one or more assets 102 with a more efficient component. As another example, initiating the performance of one or more emissions optimization actions may include causing the one or more assets 102 to switch to a different power source.

In some embodiments, the emissions system 140 and/or the user device 160 may be configured to output the long-term emissions optimization plan to a user interface 300 associated with the emissions system 140, the user device 160, another computing device, and/or one or more of the one or more assets 102 (e.g., using data output circuity 214). For example, the emissions system 140 and/or the user device 160 may be configured to output the long-term emissions optimization plan to a long-term component 302 of the user interface 300. In this regard, the long-term component 302 may be configured to display one or more long-term emissions optimization actions (e.g., optimization actions that can be performed by the one or more assets 102 in the long-term time period). In some embodiments, the long-term component 302 may include text, symbols, graphs, and/or colors indicating the long-term emissions optimization plan.

In some embodiments, the emissions system 140 and/or the user device 160 may be configured to output the short-term emissions control to a user interface 300 associated with the emissions system 140, the user device 160, another computing device, and/or one or more of the one or more assets 102 (e.g., using data output circuity 214). For example, the emissions system 140 and/or the user device 160 may be configured to output the short-term emissions control to a short-term component 304 of the user interface 300. In this regard, the short-term component 304 may be configured to display one or more short-term emissions control optimization actions (e.g., optimization actions that can be performed by the one or more assets 102 in the short-term time period). In some embodiments, the short-term component 304 may include text, symbols, graphs, and/or colors indicating the short-term emissions control.

In some embodiments, the user interface 300 embodies a user interface configured to be rendered to a native application associated with the emissions system 140, the user device 160, another computing device, and/or one or more of the one or more assets 102, for example. In some embodiments, the user interface 300 embodies a web interface accessible by a browser or other web application. In this regard, for example, the user interface 300 may be accessible by a browser or other web application associated with the emissions system 140, the user device 160, another computing device, and/or one or more of the one or more assets 102, for example.

In some embodiments, the emissions system 140 and/or the user device 160 may be configured to receive updated operational data. The updated operational data may be associated with the one or more assets 102. In some embodiments, the updated operational data may include updated short-term operational data and/or updated long-term operational data. In some embodiments, the updated operational data may be received after the performance of the one or more emissions optimization actions. That is, the updated operational data may be received after the performance of one or more long-term emissions optimization actions and/or one or more short-term emissions control optimization actions.

In some embodiments, the updated short-term operational data may include data associated with the operations of the one or more assets 102 associated with an updated short-term time period. Said differently, the updated short-term time period may be a time period associated with the current operations and/or near-term operations of the one or more assets 102 (e.g., the current operations and/or near-term operations of the one or more assets when the updated operational data is received by the emissions system 140 and/or the user device 160). For example, the updated short-term time period may refer to the operations of the one or more assets on the current hour, day, week, month, year, and/or the like and/or next hour, day, week, month, year, and/or the like. In some embodiments, the updated long-term operational data may include data associated with the operations of the one or more assets 102 associated with an updated long-term time period. For example, the updated long-term time period may refer to the operations of the one or more assets 102 on a future hour, day, week, month, year, etc. (e.g., the operations of the one or more assets 102 on a future hour, day, week, month, year, etc. from when the updated operational data is received by the emissions system 140 and/or the user device 160). In this regard, for example, the updated long-term time period may include a time period that includes up to a net zero emissions date for the one or more assets 102. Said differently, the updated long-term time period may be a time period associated with the future (e.g., planned) operations of the one or more assets 102 in the updated long-term time period (e.g., a time period other than the updated short-term time period) while the updated short-term time period may be a time period associated with the current operations and/or near-term operations of the one or more assets 102 (e.g., a time period other than the updated long-term time period).

In some embodiments, the updated short-term operational data may include updated data of the short-term operational data described above. For example, the updated short-term operational data may include updated short-term emissions data, updated short-term asset type data, updated short-term asset number data, updated short-term asset component data, updated short-term asset component configuration data, updated short-term power consumption data, updated short-term power source type data, updated short-term supplier data, updated short-term cost data, and/or the like. In some embodiments, the updated long-term operational data may include updated data of the long-term operational data described above. For example, the updated long-term operational data may include updated long-term emissions data, updated long-term net zero emissions date data, updated long-term asset type data, updated long-term asset number data, updated long-term asset component configuration data, updated long-term asset component replacement data, updated long-term asset component removal data, updated long-term power source type data, updated long-term supplier data, updated long-term cost data, and/or the like.

In some embodiments, the emissions system 140 and/or the user device 160 may be configured to generate an adjusted long-term emissions optimization plan. In some embodiments, the adjusted long-term emissions optimization plan may be generated based on applying the updated short-term operational data and/or the updated long-term operational data to the optimization model. In some embodiments, the optimization model may comprise one or more of a statistical model, an algorithmic model, a control systems model, and/or a machine learning model (e.g., using AI and machine learning circuitry 210). For example, the optimization model may utilize model predictive control and/or proportional-integral-derivative control. As another example, the optimization model may implement supervised machine learning (e.g., regression) and/or unsupervised machine learning (e.g., clustering).

In some embodiments, the adjusted long-term emissions optimization plan may include an adjusted long-term emissions estimate. In this regard, the adjusted long-term emissions estimate may include an emissions estimate for the one or more assets 102 for the updated long-term time period. For example, the adjusted long-term emissions estimate may include an emissions estimate for each future year for the one or more assets 102 (e.g., each future year from when the updated operational data is received by the emissions system 140 and/or the user device 160). In this regard, for example, the adjusted long-term emissions estimate may include an emissions estimate for the net zero emissions date associated with the one or more assets 102. In some embodiments, the adjusted long-term emissions optimization plan (e.g., based on the adjusted long-term emissions estimate) may indicate that the one or more assets 102 are on track to achieve net zero emissions by the net zero emissions date associated with the one or more assets 102. In some embodiments, the adjusted long-term emissions optimization plan may indicate that the one or more assets 102 are on track to achieve net zero emissions after the net zero emissions date associated with the one or more assets 102 (e.g., the one or more assets 102 will be above net zero emissions at the net zero emissions date). In some embodiments, the adjusted long-term emissions optimization plan may indicate that the one or more assets 102 are on track to achieve net zero emissions before the net zero emissions date associated with the one or more assets 102.

In some embodiments, the adjusted long-term emissions optimization plan may include one or more adjusted long-term emissions optimization actions. In this regard, the adjusted long-term emissions optimization actions may include optimization actions that can be performed by the one or more assets in the updated long-term time period.

In some embodiments, if the adjusted long-term emissions optimization plan indicates that the one or more assets 102 are on track to achieve net zero emissions by the net zero emissions date associated with the one or more assets 102, then the adjusted long-term emissions optimization plan may include adjusted long-term emissions optimization actions configured to cause the one or more assets 102 remain on track to achieve net zero emissions by the net zero emissions date associated with the one or more assets 102. In some embodiments, if the adjusted long-term emissions optimization plan indicates that the one or more assets 102 are on track to achieve net zero emissions after the net zero emissions date associated with the one or more assets 102, then the adjusted long-term emissions optimization plan may include adjusted long-term emissions optimization actions configured to cause the one or more assets 102 get back on track to achieve net zero emissions by the net zero emissions date associated with the one or more assets 102. In some embodiments, if the adjusted long-term emissions optimization plan indicates that the one or more assets 102 are on track to achieve net zero emissions before the net zero emissions date associated with the one or more assets 102, then the adjusted long-term emissions optimization plan may include adjusted long-term emissions optimization actions configured to cause the one or more assets 102 remain on track to achieve net zero emissions before the net zero emissions date associated with the one or more assets 102. In some embodiments, if the adjusted long-term emissions optimization plan indicates that the one or more assets 102 are on track to achieve net zero emissions before the net zero emissions date associated with the one or more assets 102, then the adjusted long-term emissions optimization plan may include adjusted long-term emissions optimization actions configured to cause the one or more assets 102 change track to achieve net zero emissions by the net zero emissions date associated with the one or more assets 102.

In some embodiments, the emissions system 140 and/or the user device 160 may be configured to generate an adjusted short-term emissions control. In some embodiments, the adjusted short-term emissions control may include an adjusted short-term emissions estimate. In this regard, the adjusted short-term emissions estimate may include an emissions estimate for the one or more assets 102 for the updated short-term time period. For example, the adjusted short-term emissions estimate may include an emissions estimate for the current day, week, month, year, and/or the like and/or the near-term day, week, month, year, and/or the like for the one or more assets 102 (e.g., whatever the short-term time period is).

In some embodiments, the adjusted short-term emissions control may be generated based at least in part on the adjusted long-term emissions optimization plan (e.g., similarly to the short-term emissions control being generated based at least in part on the long-term emissions optimization plan described above). For example, in order for the one or more assets 102 to achieve net zero emissions by the net zero emissions date associated with the one or more assets 102 in accordance with the adjusted long-term emissions optimization plan, the one or more assets 102 may need to adhere to an adjusted short-term emissions control that results in a particular emissions amount for the one or more assets 102 in the updated short-term time period. As another example, in accordance with the adjusted long-term emissions optimization plan, the one or more assets 102 may be implementing an adjusted long-term emissions optimization action, such as replacing a component of the one or more assets 102 with a more efficient component, in the long-term time period that will make a large difference in an emissions amount of the one or more assets 102 (e.g., in the updated long-term time period). As such, it may only be necessary for the one or more assets 102 to make no changes or only minor changes in the emissions amount of the one or more assets 102 in the updated short-term time period, which may reduce costs for the one or more assets 102 in the updated short-term time period (e.g., the one or more assets 102 may be able to use a component configuration setting that is cheaper but has a higher emissions amount than another component configuration setting).

In some embodiments, the adjusted short-term emissions control may include one or more adjusted short-term emissions control optimization actions. In this regard, the adjusted short-term emissions control optimization actions may include control optimization actions that can be performed by the one or more assets 102 in the updated short-term time period.

In some embodiments, the adjusted short-term emissions control may indicate that that the adjusted short-term emissions estimate is greater than the particular emissions amount necessary for the updated short-term time period in order for the one or more assets 102 to achieve net zero emissions by the net zero emissions date associated with the one or more assets 102 in accordance with the adjusted long-term emissions optimization plan. In this regard, the adjusted short-term emissions control may include one or more adjusted short-term emissions control optimization actions configured to cause the one or more assets 102 to reduce emissions such that the one or more assets 102 can meet the particular emissions amount necessary for the updated short-term time period in order for the one or more assets 102 to achieve net zero emissions by the net zero emissions date associated with the one or more assets 102.

In some embodiments, the adjusted short-term emissions control may indicate that that the adjusted short-term emissions estimate is less than the particular emissions amount necessary for the updated short-term time period in order for the one or more assets 102 to achieve net zero emissions by the net zero emissions date associated with the one or more assets 102 in accordance with the adjusted long-term emissions optimization plan. In this regard, the adjusted short-term emissions control may include one or more adjusted short-term emissions control optimization actions configured to cause the one or more assets 102 increase emissions such that the one or more assets 102 can meet the particular emissions amount necessary for the updated short-term time period in order for the one or more assets 102 to achieve net zero emissions by the net zero emissions date associated with the one or more assets 102 while potentially reducing costs associated with operating the one or more assets 102.

In some embodiments, the adjusted short-term emissions control may indicate that that the adjusted short-term emissions estimate is less than the particular emissions amount necessary for the updated short-term time period in order for the one or more assets 102 to achieve net zero emissions by the net zero emissions date associated with the one or more assets 102 in accordance with the adjusted long-term emissions optimization plan. In this regard, the adjusted short-term emissions control may include one or more adjusted short-term emissions control optimization actions configured to cause the one or more assets 102 to make no changes in emissions such that the one or more assets 102 can meet the particular emissions amount necessary for the updated short-term time period in order for the one or more assets 102 to achieve net zero emissions by the net zero emissions date associated with the one or more assets 102.

In some embodiments, the adjusted short-term emissions control may indicate that that the adjusted short-term emissions estimate is approximately equal to the particular emissions amount necessary for the updated short-term time period in order for the one or more assets 102 to achieve net zero emissions by the net zero emissions date associated with the one or more assets 102 in accordance with the adjusted long-term emissions optimization plan. In this regard, the adjusted short-term emissions control may include one or more adjusted short-term emissions control optimization actions configured to cause the one or more assets 102 to make no changes in emissions such that the one or more assets 102 can meet the particular emissions amount necessary for the updated short-term time period in order for the one or more assets 102 to achieve net zero emissions by the net zero emissions date associated with the one or more assets 102.

In some embodiments, the emissions system 140 and/or the user device 160 may be configured to initiate the performance of one or more adjusted emissions optimization actions. In some embodiments, initiating the performance of one or more adjusted emissions optimization actions may be based at least in part on the adjusted long-term emissions optimization plan and/or the adjusted short-term emissions control. In this regard, the one or more adjusted emissions optimization actions may include one or more adjusted long-term emissions optimization actions and/or one or more adjusted short-term emissions control optimization actions. Accordingly, initiating the performance of one or more adjusted emissions optimization actions may include, for example, transmitting an instruction to the one or more assets 102 to perform one or more adjusted long-term emissions optimization actions and/or one or more adjusted short-term emissions control optimization actions.

In some embodiments, the adjusted long-term emissions optimization plan may be based at least in part on one or more errors in the long-term emissions optimization plan. In some embodiments, the one or more errors in the long-term emissions optimization plan may occur when the long-term emissions optimization plan indicated that the one or more assets 102 were on track to achieve net zero emissions by the net zero emissions date associated with the one or more assets 102 (e.g., because the long-term emissions estimate indicated that the one or more assets 102 will have net zero emissions at the net zero emissions date associated with the one or more assets 102). In this regard, for example, the long-term emissions estimate in the long-term emissions optimization plan may have assumed that the one or more long-term emissions optimization actions (e.g., replacing a component of the one more assets 102 with a more efficient component) would reduce the emissions amount of the one or more assets 102 by an expected amount. However, the updated operational data (e.g., the updated short-term operational data and/or updated long-term operational data) may indicate that the one or more long-term emissions optimization actions did not reduce the emissions amount of the one or more assets 102 in the long-term time period by the expected amount.

For example, the one or more long-term emissions optimization actions reduced the emissions amount more than expected amount (e.g., the one or more assets 102 may now be on track to achieve net zero emissions before the net zero emissions date associated with the one or more assets 102). In this regard, the adjusted long-term emissions optimization plan may include one or more adjusted long-term emissions optimization actions that accounts for the error in the long-term emissions optimization plan that resulted in the one or more long-term emissions optimization actions reducing the emissions amount more than expected amount. Said differently, for example, under the adjusted long-term emissions optimization plan the one or more assets 102 may not have to take as intensive emissions reduction steps to still achieve net zero emissions by the net zero emissions date associated with the one or more assets 102.

As another example, the one or more long-term emissions optimization actions reduced the emissions amount less than the expected amount (e.g., the one or more assets 102 may now be on track to achieve net zero emissions after the net zero emissions date associated with the one or more assets 102). In this regard, the adjusted long-term emissions optimization plan may include one or more adjusted long-term emissions optimization actions that accounts for the error in the long-term emissions optimization plan that resulted in the one or more long-term emissions optimization actions increasing the emissions amount more than expected amount. Said differently, for example, under the adjusted long-term emissions optimization plan the one or more assets 102 may have to take more intensive emissions reduction steps to still achieve net zero emissions by the net zero emissions date associated with the one or more assets 102.

In some embodiments, the one or more errors in the long-term emissions optimization plan may occur when the long-term emissions optimization plan indicated that the one or more assets 102 were on track to achieve net zero emissions after the net zero emissions date associated with the one or more assets 102 (e.g., because the long-term emissions estimate indicated that the one or more assets 102 will have greater than net zero emissions at the net zero emissions date associated with the one or more assets 102). In this regard, for example, the long-term emissions estimate in the long-term emissions optimization plan may have assumed that the one or more long-term emissions optimization actions (e.g., replacing a component of the one more assets 102 with a more efficient component) would reduce the emissions amount of the one or more assets 102 by an expected amount. However, the updated operational data (e.g., the updated short-term operational data and/or updated long-term operational data) may indicate that the one or more long-term emissions optimization actions did not reduce the emissions amount of the one or more assets 102 in the long-term time period by the expected amount.

For example, the one or more long-term emissions optimization actions reduced the emissions amount more than expected amount (e.g., the one or more assets 102 may now be on track to achieve net zero emissions before the net zero emissions date associated with the one or more assets 102). In this regard, the adjusted long-term emissions optimization plan may include one or more adjusted long-term emissions optimization actions that accounts for the error in the long-term emissions optimization plan that resulted in the one or more long-term emissions optimization actions reducing the emissions amount more than expected amount. Said differently, for example, under the adjusted long-term emissions optimization plan the one or more assets 102 may not have to take as intensive emissions reduction steps to achieve net zero emissions by the net zero emissions date associated with the one or more assets 102.

As another example, the one or more long-term emissions optimization actions reduced the emissions amount less than the expected amount (e.g., the one or more assets 102 may still be on track to achieve net zero emissions after the net zero emissions date associated with the one or more assets 102). In this regard, the adjusted long-term emissions optimization plan may include one or more adjusted long-term emissions optimization actions that accounts for the error in the long-term emissions optimization plan that resulted in the one or more long-term emissions optimization actions increasing the emissions amount more than expected amount. Said differently, for example, under the adjusted long-term emissions optimization plan the one or more assets 102 may have to take more intensive emissions reduction steps to achieve net zero emissions by the net zero emissions date associated with the one or more assets 102.

In some embodiments, the one or more errors in the long-term emissions optimization plan may occur when the long-term emissions optimization plan indicated that the one or more assets 102 were on track to achieve net zero emissions before the net zero emissions date associated with the one or more assets 102 (e.g., because the long-term emissions estimate indicated that the one or more assets 102 will have net zero emissions before the net zero emissions date associated with the one or more assets 102). In this regard, for example, the long-term emissions estimate in the long-term emissions optimization plan may have assumed that the one or more long-term emissions optimization actions (e.g., replacing a component of the one more assets 102 with a more efficient component) would reduce the emissions amount of the one or more assets 102 by an expected amount. However, the updated operational data (e.g., the updated short-term operational data and/or updated long-term operational data) may indicate that the one or more long-term emissions optimization actions did not reduce the emissions amount of the one or more assets 102 in the long-term time period by the expected amount.

For example, the one or more long-term emissions optimization actions reduced the emissions amount more than expected amount (e.g., the one or more assets 102 may still be on track to achieve net zero emissions before the net zero emissions date associated with the one or more assets 102). In this regard, the adjusted long-term emissions optimization plan may include one or more adjusted long-term emissions optimization actions that accounts for the error in the long-term emissions optimization plan that resulted in the one or more long-term emissions optimization actions reducing the emissions amount more than expected amount. Said differently, for example, under the adjusted long-term emissions optimization plan the one or more assets 102 may not have to take as intensive emissions reduction steps to achieve net zero emissions by (or before) the net zero emissions date associated with the one or more assets 102.

As another example, the one or more long-term emissions optimization actions reduced the emissions amount less than the expected amount (e.g., the one or more assets 102 may still on track to achieve net zero emissions before the net zero emissions date associated with the one or more assets 102). In this regard, the adjusted long-term emissions optimization plan may include one or more adjusted long-term emissions optimization actions that accounts for the error in the long-term emissions optimization plan that resulted in the one or more long-term emissions optimization actions increasing the emissions amount more than expected amount. Said differently, for example, under the adjusted long-term emissions optimization plan the one or more assets 102 may be able to take less intensive emissions reduction steps and still achieve net zero emissions by (or before) the net zero emissions date associated with the one or more assets 102.

In some embodiments, the adjusted short-term emissions control may be based at least in part on one or more errors in the short-term emissions control. In some embodiments, the one or more errors in the short-term emissions control may occur when the short-term emissions control indicated that the short-term emissions estimate was approximately equal to the particular emissions amount necessary for the short-term time period in order for the one or more assets 102 to achieve net zero emissions by the net zero emissions date associated with the one or more assets 102 in accordance with the long-term emissions optimization plan. In this regard, for example, the short-term emissions estimate in the short-term emissions control may have assumed that the one or more short-term emissions control optimization actions cause the one or more assets to make no changes in emissions such that the one or more assets 102 can meet the particular emissions amount necessary for the short-term time period. However, the updated operational data (e.g., the updated short-term operational data and/or updated long-term operational data) may indicate that the one or more short-term emissions control optimization actions did cause changes in the emissions such that the one or more assets 102 can did not meet the particular emissions amount necessary for the short-term time period.

For example, the one or more short-term emissions control optimization actions may have caused the one or more assets 102 to increase emissions such that the one or more assets 102 had emissions greater than the particular emissions amount necessary for the short-term time period. In this regard, the adjusted short-term emissions control may include one or more adjusted short-term emissions control optimization actions that accounts for the error in the short-term emissions control that resulted in the one or more short-term emissions control optimization actions causing the one or more assets 102 to increase emissions such that the one or more assets 102 had emissions greater than the particular emissions amount necessary for the short-term time period.

As another example, the one or more short-term emissions control optimization actions may have caused the one or more assets 102 to decrease emissions such that the one or more assets 102 had emissions less than the particular emissions amount necessary for the short-term time period. In this regard, the adjusted short-term emissions control may include one or more adjusted short-term emissions control optimization actions that accounts for the error in the short-term emissions control that resulted in the one or more short-term emissions control optimization actions causing the one or more assets 102 to decrease emissions such that the one or more assets 102 had emissions less than the particular emissions amount necessary for the short-term time period.

In some embodiments, the one or more errors in the short-term emissions control may occur when the short-term emissions control indicated that the short-term emissions estimate was greater than the particular emissions amount necessary for the short-term time period in order for the one or more assets 102 to achieve net zero emissions by the net zero emissions date associated with the one or more assets 102 in accordance with the long-term emissions optimization plan. In this regard, for example, the short-term emissions estimate in the short-term emissions control may have assumed that the one or more short-term emissions control optimization actions cause the one or more assets 102 to reduce emissions by an expected amount such that the one or more assets 102 can meet the particular emissions amount necessary for the short-term time period. However, the updated operational data (e.g., the updated short-term operational data and/or updated long-term operational data) may indicate that the one or more short-term emissions control optimization actions did not reduce emissions by the expected amount such that the one or more assets 102 did not meet the particular emissions amount necessary for the short-term time period.

For example, the one or more short-term emissions control optimization actions may have caused the one or more assets 102 to reduce emissions by less than the expected amount such that the one or more assets 102 had emissions greater than the particular emissions amount necessary for the short-term time period. In this regard, the adjusted short-term emissions control may include one or more adjusted short-term emissions control optimization actions that accounts for the error in the short-term emissions control that resulted in the one or more short-term emissions control optimization actions causing the one or more assets 102 to reduce emissions less than the expected amount such that the one or more assets 102 had emissions greater than the particular emissions amount necessary for the short-term time period.

As another example, the one or more short-term emissions control optimization actions may have caused the one or more assets 102 to decrease emissions by more than the expected amount such that the one or more assets 102 had emissions less than the particular emissions amount necessary for the short-term time period. In this regard, the adjusted short-term emissions control may include one or more adjusted short-term emissions control optimization actions that accounts for the error in the short-term emissions control that resulted in the one or more short-term emissions control optimization actions causing the one or more assets 102 to decrease emissions more than the expected amount such that the one or more assets 102 had emissions less than the particular emissions amount necessary for the short-term time period.

In some embodiments, the one or more errors in the short-term emissions control may occur when the short-term emissions control indicated that the short-term emissions estimate was less than the particular emissions amount necessary for the short-term time period in order for the one or more assets 102 to achieve net zero emissions by the net zero emissions date associated with the one or more assets 102 in accordance with the long-term emissions optimization plan. In this regard, for example, the short-term emissions estimate in the short-term emissions control may have assumed that the one or more short-term emissions control optimization actions cause the one or more assets 102 to increase emissions (e.g., if increasing emissions reduces costs) by an expected amount such that the one or more assets 102 can meet the particular emissions amount necessary for the short-term time period. However, the updated operational data (e.g., the updated short-term operational data and/or updated long-term operational data) may indicate that the one or more short-term emissions control optimization actions did not increase emissions by the expected amount such that the one or more assets 102 did not meet the particular emissions amount necessary for the short-term time period.

For example, the one or more short-term emissions control optimization actions may have caused the one or more assets 102 to increase emissions by less than the expected amount such that the one or more assets 102 had emissions less than the particular emissions amount necessary for the short-term time period. In this regard, the adjusted short-term emissions control may include one or more adjusted short-term emissions control optimization actions that accounts for the error in the short-term emissions control that resulted in the one or more short-term emissions control optimization actions causing the one or more assets 102 to increase emissions less than the expected amount such that the one or more assets 102 had emissions less than the particular emissions amount necessary for the short-term time period.

As another example, the one or more short-term emissions control optimization actions may have caused the one or more assets 102 to increase emissions by more than the expected amount such that the one or more assets 102 had emissions greater than the particular emissions amount necessary for the short-term time period. In this regard, the adjusted short-term emissions control may include one or more adjusted short-term emissions control optimization actions that accounts for the error in the short-term emissions control that resulted in the one or more short-term emissions control optimization actions causing the one or more assets 102 to increase emissions more than the expected amount such that the one or more assets 102 had emissions greater than the particular emissions amount necessary for the short-term time period.

In some embodiments, the one or more errors in the short-term emissions control may occur when the short-term emissions control indicated that the short-term emissions estimate was less than the particular emissions amount necessary for the short-term time period in order for the one or more assets 102 to achieve net zero emissions by the net zero emissions date associated with the one or more assets 102 in accordance with the long-term emissions optimization plan. In this regard, for example, the short-term emissions estimate in the short-term emissions control may have assumed that the one or more short-term emissions control optimization actions cause the one or more assets to make no changes in emissions such that the one or more assets 102 can meet (or be less than) the particular emissions amount necessary for the short-term time period. However, the updated operational data (e.g., the updated short-term operational data and/or updated long-term operational data) may indicate that the one or more short-term emissions control optimization actions did cause changes in the emissions such that the one or more assets 102 did not meet the particular emissions amount necessary for the short-term time period.

For example, the one or more short-term emissions control optimization actions may have caused the one or more assets 102 to increase emissions such that the one or more assets 102 had emissions greater than the particular emissions amount necessary for the short-term time period. In this regard, the adjusted short-term emissions control may include one or more adjusted short-term emissions control optimization actions that accounts for the error in the short-term emissions control that resulted in the one or more short-term emissions control optimization actions causing the one or more assets 102 to increase emissions such that the one or more assets 102 had emissions greater than the particular emissions amount necessary for the short-term time period.

As another example, the one or more short-term emissions control optimization actions may have caused the one or more assets 102 to decrease emissions such that the one or more assets 102 had emissions less than the particular emissions amount necessary for the short-term time period. In this regard, the adjusted short-term emissions control may include one or more adjusted short-term emissions control optimization actions that accounts for the error in the short-term emissions control that resulted in the one or more short-term emissions control optimization actions causing the one or more assets 102 to decrease emissions such that the one or more assets 102 had emissions less than the particular emissions amount necessary for the short-term time period.

In some embodiments, the adjusted long-term emissions optimization plan may be based at least in part on one or more errors in the short-term emissions control. For example, the short-term emissions estimate generated by the short-term emissions control may be incorrect (e.g., due to errors in operational data, such as short-term operational data and/or long-term operational data). In this regard, for example, the one or more short-term emissions control optimization actions implemented by the one or more assets 102 may have caused the one or more assets to not meet the particular emissions amount necessary for the short-term time period in order for the one or more assets 102 to achieve net zero emissions by the net zero emissions data associated with the one or more assets 102. Accordingly, the adjusted long-term emissions optimization plan may account for the fact that the one or more assets 102 did not adhere to the long-term emissions optimization plan due to the one or more errors in the short-term emissions control.

In some embodiments, the adjusted short-term emissions control may be based at least in part on one or more errors in the long-term emissions optimization plan. For example, the long-term emissions optimization plan may have caused a short-term emissions control to be generated that results in a particular emissions amount for the one or more assets 102 in the short-term time period. However, the particular emissions amount for the one or more assets 102 in the short-term time period may be unattainable by the one or more assets 102 in the short-term time period (e.g., the particular emissions amount was caused by one or more errors in the operational data and/or the optimization model used to generate the long-term emissions optimization plan). In this regard, for example, the one or more assets 102 may not adhere to the short-term emissions control. Accordingly, the adjusted short-term emissions control may account for the fact that the one or more assets 102 did not adhere to the short-term emissions control due to the one or more errors in the long-term emissions optimization plan.

In some embodiments, the emissions system 140 and/or the user device 160 may be configured to output the adjusted long-term emissions optimization plan to a user interface 300 associated with the emissions system 140, the user device 160, and/or one or more of the one or more assets 102. For example, the emissions system 140 and/or the user device 160 may be configured to output the adjusted long-term emissions optimization plan to the long-term component 302 of the user interface 300. In this regard, the long-term component 302 may be configured to display one or more adjusted long-term emissions optimization actions (e.g., optimization actions that can be performed by the one or more assets 102 in the long-term time period). In some embodiments, the long-term component 302 may include text, symbols, graphs, and/or colors indicating adjusted the long-term emissions optimization plan.

In some embodiments, the emissions system 140 and/or the user device 160 may be configured to output the adjusted short-term emissions control to a user interface 300 associated with the emissions system 140, the user device 160, and/or one or more of the one or more assets 102. For example, the emissions system 140 and/or the user device 160 may be configured to output the adjusted short-term emissions control to the short-term component 304 of the user interface 300. In this regard, the short-term component 304 may be configured to display one or more adjusted short-term emissions control optimization actions (e.g., optimization actions that can be performed by the one or more assets 102 in the short-term time period). In some embodiments, the short-term component 304 may include text, symbols, graphs, and/or colors indicating the adjusted short-term emissions control.

In some embodiments, the emissions system 140 and/or the user device 160 may be configured to regularly generate new adjusted long-term emissions optimization plans and/or new adjusted short-term emissions controls. In this regard, for example, the emissions system 140 and/or the user device 160 may be configured to regularly incorporate feedback on the success of previous iterations of the long-term emissions optimization plan, adjusted long-term emissions optimization plan, short-term emissions control, and/or adjusted short-term emissions control (e.g., whether or not there are errors in the long-term emissions optimization plan, adjusted long-term emissions optimization plan, short-term emissions control, and/or adjusted short-term emissions control).

In some embodiments, the emissions system 140 and/or the user device 160 may be configured to generate new adjusted long-term emissions optimization plans and/or new adjusted short-term emissions controls on a periodic basis. For example, the emissions system 140 and/or the user device 160 may be configured to generate new adjusted long-term emissions optimization plans and/or new adjusted short-term emissions controls once per hour, once per day, once per week, once per month, once per quarter, etc. Additionally or alternatively, the emissions system 140 and/or the user device 160 may be configured to generate new adjusted long-term emissions optimization plans and/or new adjusted short-term emissions controls each time new operational data associated with the one or more assets is received. Additionally or alternatively, the emissions system 140 and/or the user device 160 may be configured to generate new adjusted long-term emissions optimization plans and/or new adjusted short-term emissions controls in response to a user instruction. For example, the emissions system 140 and/or the user device 160 may be configured to generate new adjusted long-term emissions optimization plans and/or new adjusted short-term emissions controls in response to a user selecting update component 306 on the user interface 300.

Example Methods

Figure 4:
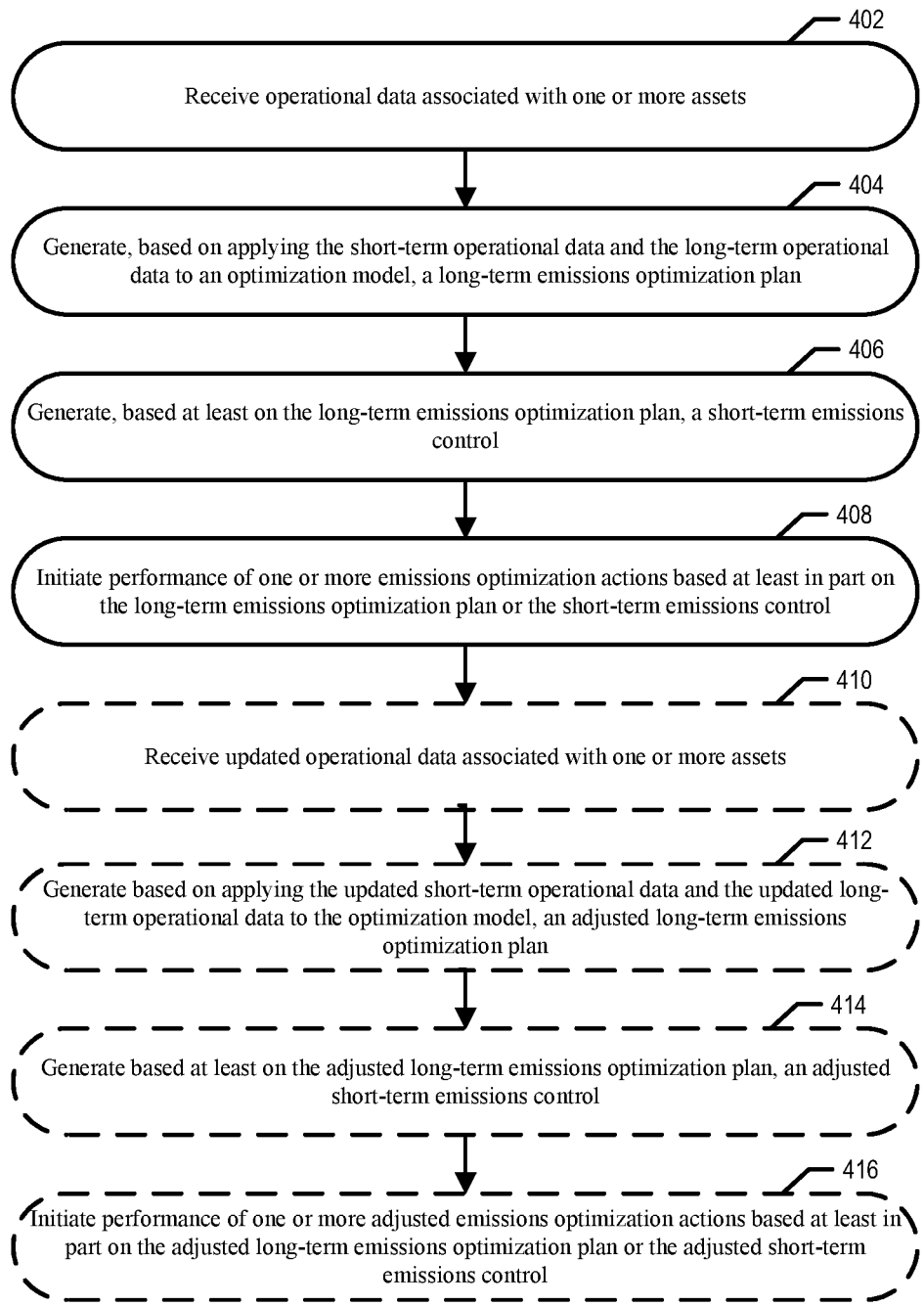
FIG. 4 illustrates a flowchart of an example method for constrained emissions control, emissions optimization, and emissions planning in accordance with one or more embodiments of the present disclosure.

Referring now to FIG. 4, a flowchart providing an example method 400 for constrained emissions control, emissions optimization, and emissions planning is illustrated. In this regard, FIG. 4 illustrates operations that may be performed by the emissions system 140, the user device 160, the one or more assets 102, and/or the like. In some embodiments, the example method 400 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 400.

As shown in block 402, the method for constrained emissions control, emissions optimization, and emissions planning may include receiving operational data associated with one or more assets. As described above, the one or more assets may be any type of facility associated with a user associated with the environment. As described above, in some embodiments, the operational data may include short-term operational data and/or long-term operational data. In some embodiments, the short-term operational data may include data associated with the operations of the one or more assets associated with a short-term time period. Said differently, the short-term time period may be a time period associated with the current operations and/or near-term operations of the one or more assets. In some embodiments, the long-term operational data may include data associated with the operations of the one or more assets associated with a long-term time period. For example, the long-term time period may refer to the operations of the one or more assets on a future hour, day, week, month, year, etc. In this regard, for example, the long-term time period may include a time period that includes up to a net zero emissions date for the one or more assets. Said differently, the long-term time period may be a time period associated with the future (e.g., planned) operations of the one or more assets in the long-term time period (e.g., a time period other than the short-term time period) while the short-term time period may be a time period associated with the current operations and/or near-term operations of the one or more assets (e.g., a time period other than the long-term time period).

As described above, in some embodiments, short-term operational data may include the short-term emissions data, short-term asset type data, short-term asset number data, short-term asset component data, short-term asset component configuration data, short-term power consumption data, short-term power source type data, short-term supplier data, short-term financial data, and/or the like. In some embodiments, the long-term operational data may include long-term emissions data, long-term net zero emissions date data, long-term asset type data, long-term asset number data, long-term asset component configuration data, long-term asset component replacement data, long-term asset component removal data, long-term power source type data, long-term supplier data, long-term financial data, and/or the like.

As shown in block 404, the method for constrained emissions control, emissions optimization, and emissions planning may include generating, based on applying the short-term operational data and the long-term operational data to an optimization model, a long-term emissions optimization plan. As described above, in some embodiments, the long-term emissions optimization plan may be generated based on applying the short-term operational data and/or the long-term operational data to an optimization model. In some embodiments, the optimization model may comprise one or more of a statistical model, an algorithmic model, a control systems model, first principles mode, financial model, and/or a machine learning model. For example, the optimization model may utilize model predictive control and/or proportional-integral-derivative control. In this regard, for example, the optimization model may utilize one or more cascaded model predictive control loops. As another example, the optimization model may implement supervised machine learning (e.g., regression) and/or unsupervised machine learning (e.g., clustering).

As described above, in some embodiments, the long-term emissions optimization plan may include a long-term emissions estimate. In this regard, the long-term emissions estimate may include an emissions estimate for the one or more assets for the long-term time period. For example, the long-term emissions estimate may include an emissions estimate for each future year for the one or more assets. In this regard, for example, the long-term emissions estimate may include an emissions estimate for the net zero emissions date associated with the one or more assets.

As described above, in some embodiments, the long-term emissions optimization plan may indicate that the one or more assets are on track to achieve net zero emissions by the net zero emissions date associated with the one or more assets. In some embodiments, the long-term emissions optimization plan may indicate that the one or more assets are on track to achieve net zero emissions after the net zero emissions date associated with the one or more assets. In some embodiments, the long-term emissions optimization plan may indicate that the one or more assets are on track to achieve net zero emissions before the net zero emissions date associated with the one or more assets.

As described above, in some embodiments, the long-term emissions optimization plan may include one or more long-term emissions optimization actions. In this regard, the long-term emissions optimization actions may include optimization actions that can be performed by the one or more assets in the long-term time period. In some embodiments, if the long-term emissions optimization plan indicates that the one or more assets are on track to achieve net zero emissions by the net zero emissions date associated with the one or more assets, then the long-term emissions optimization plan may include long-term emissions optimization actions configured to cause the one or more assets remain on track to achieve net zero emissions by the net zero emissions date associated with the one or more assets. In some embodiments, if the long-term emissions optimization plan indicates that the one or more assets are on track to achieve net zero emissions after the net zero emissions date associated with the one or more assets, then the long-term emissions optimization plan may include long-term emissions optimization actions configured to cause the one or more assets get back on track to achieve net zero emissions by the net zero emissions date associated with the one or more assets. In some embodiments, if the long-term emissions optimization plan indicates that the one or more assets are on track to achieve net zero emissions before the net zero emissions date associated with the one or more assets, then the long-term emissions optimization plan may include long-term emissions optimization actions configured to cause the one or more assets remain on track to achieve net zero emissions before the net zero emissions date associated with the one or more assets. In some embodiments, if the long-term emissions optimization plan indicates that the one or more assets are on track to achieve net zero emissions before the net zero emissions date associated with the one or more assets, then the long-term emissions optimization plan may include long-term emissions optimization actions configured to cause the one or more assets change track to achieve net zero emissions by the net zero emissions date associated with the one or more assets.

As shown in block 406, the method for constrained emissions control, emissions optimization, and emissions planning may include generating, based at least on the long-term emissions optimization plan, a short-term emissions control. As described above, in some embodiments, the short-term emissions control may include a short-term emissions estimate. In this regard, the short-term emissions estimate may include an emissions estimate for the one or more assets for the short-term time period.

As described above, in some embodiments, the short-term emissions control may be generated based at least in part on the long-term emissions optimization plan. For example, in order for the one or more assets to achieve net zero emissions by the net zero emissions date associated with the one or more assets in accordance with the long-term emissions optimization plan, the one or more assets may need to adhere to a short-term emissions control that results in a particular emissions amount for the one or more assets in the short-term time period. As another example, in accordance with the long-term emissions optimization plan, the one or more assets may be implementing a long-term emissions optimization action, such as replacing a component of the one or more assets with a more efficient component, in the long-term time period that will make a large difference in an emissions amount of the one or more assets (e.g., in the long-term time period). As such, it may only be necessary for the one or more assets to make no changes or only minor changes in the emissions amount of the one or more assets in the short-term time period, which may reduce costs for the one or more assets in the short-term time period (e.g., the one or more assets may be able to use a component configuration setting that is cheaper but has a higher emissions amount than another component configuration setting). Said differently, as an example, the one or more assets may be able to achieve net zero emissions by the net zero emissions date associated with the one or more assets by making no changes or only minor changes in the emissions amount of the one or more assets in the short-term time period because the long-term emissions optimization plan may include one or more long-term emissions optimization actions that cause a large difference in the emissions amount in the long-term that accounts for (e.g., makes up for) the one or more assets making no changes or only minor changes in the emissions amount of the one or more assets in the short-term time period.

As described above, in some embodiments, the short-term emissions control may include one or more short-term emissions control optimization actions. In this regard, the short-term emissions control optimization actions may include control optimization actions that can be performed by the one or more assets in the short-term time period.

In some embodiments, the short-term emissions control may indicate that that the short-term emissions estimate is greater than the particular emissions amount necessary for the short-term time period in order for the one or more assets to achieve net zero emissions by the net zero emissions date associated with the one or more assets in accordance with the long-term emissions optimization plan. In this regard, the short-term emissions control may include one or more short-term emissions control optimization actions configured to cause the one or more assets to reduce emissions such that the one or more assets can meet the particular emissions amount necessary for the short-term time period in order for the one or more assets to achieve net zero emissions by the net zero emissions date associated with the one or more assets.

In some embodiments, the short-term emissions control may indicate that that the short-term emissions estimate is less than the particular emissions amount necessary for the short-term time period in order for the one or more assets to achieve net zero emissions by the net zero emissions date associated with the one or more assets in accordance with the long-term emissions optimization plan. In this regard, the short-term emissions control may include one or more short-term emissions control optimization actions configured to cause the one or more assets increase emissions such that the one or more assets can meet the particular emissions amount necessary for the short-term time period in order for the one or more assets to achieve net zero emissions by the net zero emissions date associated with the one or more assets while potentially reducing costs associated with operating the one or more assets.

In some embodiments, the short-term emissions control may indicate that that the short-term emissions estimate is less than the particular emissions amount necessary for the short-term time period in order for the one or more assets to achieve net zero emissions by the net zero emissions date associated with the one or more assets in accordance with the long-term emissions optimization plan. In this regard, the short-term emissions control may include one or more short-term emissions control optimization actions configured to cause the one or more assets to make no changes in emissions such that the one or more assets can meet the particular emissions amount necessary for the short-term time period in order for the one or more assets to achieve net zero emissions by the net zero emissions date associated with the one or more assets.

In some embodiments, the short-term emissions control may indicate that that the short-term emissions estimate is approximately equal to the particular emissions amount necessary for the short-term time period in order for the one or more assets to achieve net zero emissions by the net zero emissions date associated with the one or more assets in accordance with the long-term emissions optimization plan. In this regard, the short-term emissions control may include one or more short-term emissions control optimization actions configured to cause the one or more assets to make no changes in emissions such that the one or more assets can meet the particular emissions amount necessary for the short-term time period in order for the one or more assets to achieve net zero emissions by the net zero emissions date associated with the one or more assets.

As shown in block 408, the method for constrained emissions control, emissions optimization, and emissions planning may include initiating performance of one or more emissions optimization actions based at least in part on the long-term emissions optimization plan or the short-term emissions control. As described above, in some embodiments, initiating the performance of one or more emissions optimization actions may be based at least in part on the long-term emissions optimization plan and/or the short-term emissions control. In this regard, the one or more emissions optimization actions may include one or more long-term emissions optimization actions and/or one or more short-term emissions control optimization actions. For example, initiating the performance of one or more emissions optimization actions may include transmitting an instruction to the one or more assets to perform one or more long-term emissions optimization actions and/or one or more short-term emissions control optimization actions. As another example, initiating the performance of one or more emissions optimization actions may include scheduling the replacement of a component of the one or more assets with a more efficient component. As another example, initiating the performance of one or more emissions optimization actions may include causing the one or more assets to switch to a different power source.

As described above, the long-term emissions optimization plan and/or the short-term emissions control may be outputted to a user interface.

As shown in block 410, the method for constrained emissions control, emissions optimization, and emissions planning may optionally include receiving updated operational data associated with one or more assets. As described above, in some embodiments, the updated operational data may include updated short-term operational data and/or updated long-term operational data. In some embodiments, the updated operational data may be received after the performance of the one or more emissions optimization actions. That is, the updated operational data may be received after the performance of one or more long-term emissions optimization actions and/or one or more short-term emissions control optimization actions. In some embodiments, the updated short-term operational data and/or the updated long-term operational data may include updated data of the short-term operational data and/or long-term operational data described above.

As shown in block 412, the method for constrained emissions control, emissions optimization, and emissions planning may optionally include generating, based on applying the updated short-term operational data and the updated long-term operational data to the optimization model, an adjusted long-term emissions optimization plan. As described above, in some embodiments, the adjusted long-term emissions optimization plan may be generated based on applying the updated short-term operational data and/or the updated long-term operational data to the optimization model. In some embodiments, the optimization model may comprise one or more of a statistical model, an algorithmic model, a control systems model, and/or a machine learning model. For example, the optimization model may utilize model predictive control and/or proportional-integral-derivative control. As another example, the optimization model may implement supervised machine learning (e.g., regression) and/or unsupervised machine learning (e.g., clustering).

As described above, in some embodiments, the adjusted long-term emissions optimization plan may include an adjusted long-term emissions estimate. In this regard, the adjusted long-term emissions estimate may include an emissions estimate for the one or more assets for the updated long-term time period. In this regard, for example, the adjusted long-term emissions estimate may include an emissions estimate for the net zero emissions date associated with the one or more assets. In some embodiments, the adjusted long-term emissions optimization plan (e.g., based on the adjusted long-term emissions estimate) may indicate that the one or more assets are on track to achieve net zero emissions by the net zero emissions date associated with the one or more assets. In some embodiments, the adjusted long-term emissions optimization plan may indicate that the one or more assets are on track to achieve net zero emissions after the net zero emissions date associated with the one or more assets (e.g., the one or more assets will be above net zero emissions at the net zero emissions date). In some embodiments, the adjusted long-term emissions optimization plan may indicate that the one or more assets are on track to achieve net zero emissions before the net zero emissions date associated with the one or more assets.

As described above, in some embodiments, the adjusted long-term emissions optimization plan may include one or more adjusted long-term emissions optimization actions. In this regard, the adjusted long-term emissions optimization actions may include optimization actions that can be performed by the one or more assets in the updated long-term time period.

As described above, in some embodiments, if the adjusted long-term emissions optimization plan indicates that the one or more assets are on track to achieve net zero emissions by the net zero emissions date associated with the one or more assets, then the adjusted long-term emissions optimization plan may include adjusted long-term emissions optimization actions configured to cause the one or more assets remain on track to achieve net zero emissions by the net zero emissions date associated with the one or more assets. In some embodiments, if the adjusted long-term emissions optimization plan indicates that the one or more assets are on track to achieve net zero emissions after the net zero emissions date associated with the one or more assets, then the adjusted long-term emissions optimization plan may include adjusted long-term emissions optimization actions configured to cause the one or more assets get back on track to achieve net zero emissions by the net zero emissions date associated with the one or more assets. In some embodiments, if the adjusted long-term emissions optimization plan indicates that the one or more assets are on track to achieve net zero emissions before the net zero emissions date associated with the one or more assets, then the adjusted long-term emissions optimization plan may include adjusted long-term emissions optimization actions configured to cause the one or more assets remain on track to achieve net zero emissions before the net zero emissions date associated with the one or more assets. In some embodiments, if the adjusted long-term emissions optimization plan indicates that the one or more assets are on track to achieve net zero emissions before the net zero emissions date associated with the one or more assets, then the adjusted long-term emissions optimization plan may include adjusted long-term emissions optimization actions configured to cause the one or more assets change track to achieve net zero emissions by the net zero emissions date associated with the one or more assets.

As shown in block 414, the method for constrained emissions control, emissions optimization, and emissions planning may optionally include generating, based at least on the adjusted long-term emissions optimization plan, an adjusted short-term emissions control. As described above, in the adjusted short-term emissions control may include an adjusted short-term emissions estimate. In this regard, the adjusted short-term emissions estimate may include an emissions estimate for the one or more assets for the updated short-term time period. As described above, the adjusted short-term emissions control may be generated based at least in part on the adjusted long-term emissions optimization plan (e.g., similarly to the short-term emissions control being generated based at least in part on the long-term emissions optimization plan described above).

As described above, in some embodiments, the adjusted short-term emissions control may include one or more adjusted short-term emissions control optimization actions. In this regard, the adjusted short-term emissions control optimization actions may include control optimization actions that can be performed by the one or more assets in the updated short-term time period.

As described above, in some embodiments, the adjusted short-term emissions control may indicate that that the adjusted short-term emissions estimate is greater than the particular emissions amount necessary for the updated short-term time period in order for the one or more assets to achieve net zero emissions by the net zero emissions date associated with the one or more assets in accordance with the adjusted long-term emissions optimization plan. In this regard, the adjusted short-term emissions control may include one or more adjusted short-term emissions control optimization actions configured to cause the one or more assets to reduce emissions such that the one or more assets can meet the particular emissions amount necessary for the updated short-term time period in order for the one or more assets to achieve net zero emissions by the net zero emissions date associated with the one or more assets.

As described above, in some embodiments, the adjusted short-term emissions control may indicate that that the adjusted short-term emissions estimate is less than the particular emissions amount necessary for the updated short-term time period in order for the one or more assets to achieve net zero emissions by the net zero emissions date associated with the one or more assets in accordance with the adjusted long-term emissions optimization plan. In this regard, the adjusted short-term emissions control may include one or more adjusted short-term emissions control optimization actions configured to cause the one or more assets increase emissions such that the one or more assets can meet the particular emissions amount necessary for the updated short-term time period in order for the one or more assets to achieve net zero emissions by the net zero emissions date associated with the one or more assets while potentially reducing costs associated with operating the one or more assets.

As described above, in some embodiments, the adjusted short-term emissions control may indicate that that the adjusted short-term emissions estimate is less than the particular emissions amount necessary for the updated short-term time period in order for the one or more assets to achieve net zero emissions by the net zero emissions date associated with the one or more assets in accordance with the adjusted long-term emissions optimization plan. In this regard, the adjusted short-term emissions control may include one or more adjusted short-term emissions control optimization actions configured to cause the one or more assets to make no changes in emissions such that the one or more assets can meet the particular emissions amount necessary for the updated short-term time period in order for the one or more assets to achieve net zero emissions by the net zero emissions date associated with the one or more assets.

As described above, in some embodiments, the adjusted short-term emissions control may indicate that that the adjusted short-term emissions estimate is approximately equal to the particular emissions amount necessary for the updated short-term time period in order for the one or more assets to achieve net zero emissions by the net zero emissions date associated with the one or more assets in accordance with the adjusted long-term emissions optimization plan. In this regard, the adjusted short-term emissions control may include one or more adjusted short-term emissions control optimization actions configured to cause the one or more assets to make no changes in emissions such that the one or more assets can meet the particular emissions amount necessary for the updated short-term time period in order for the one or more assets to achieve net zero emissions by the net zero emissions date associated with the one or more assets.

As shown in block 416, the method for constrained emissions control, emissions optimization, and emissions planning may optionally include initiating performance of one or more adjusted emissions optimization actions based at least in part on the adjusted long-term emissions optimization plan or the adjusted short-term emissions control. As described above, in some embodiments, initiating the performance of one or more adjusted emissions optimization actions may be based at least in part on the adjusted long-term emissions optimization plan and/or the adjusted short-term emissions control. In this regard, the one or more adjusted emissions optimization actions may include one or more adjusted long-term emissions optimization actions and/or one or more adjusted short-term emissions control optimization actions. Accordingly, initiating the performance of one or more adjusted emissions optimization actions may include, for example, transmitting an instruction to the one or more assets to perform one or more adjusted long-term emissions optimization actions and/or one or more adjusted short-term emissions control optimization actions.

As described above, in some embodiments, the adjusted long-term emissions optimization plan may be based at least in part on one or more errors in the long-term emissions optimization plan. In some embodiments, the one or more errors in the long-term emissions optimization plan may occur when the long-term emissions optimization plan indicated that the one or more assets were on track to achieve net zero emissions by the net zero emissions date associated with the one or more assets (e.g., because the long-term emissions estimate indicated that the one or more assets will have net zero emissions at the net zero emissions date associated with the one or more assets). In this regard, for example, the long-term emissions estimate in the long-term emissions optimization plan may have assumed that the one or more long-term emissions optimization actions (e.g., replacing a component of the one more assets with a more efficient component) would reduce the emissions amount of the one or more assets by an expected amount. However, the updated operational data (e.g., the updated short-term operational data and/or updated long-term operational data) may indicate that the one or more long-term emissions optimization actions did not reduce the emissions amount of the one or more assets in the long-term time period by the expected amount.

For example, the one or more long-term emissions optimization actions reduced the emissions amount more than expected amount (e.g., the one or more assets may now be on track to achieve net zero emissions before the net zero emissions date associated with the one or more assets). In this regard, the adjusted long-term emissions optimization plan may include one or more adjusted long-term emissions optimization actions that accounts for the error in the long-term emissions optimization plan that resulted in the one or more long-term emissions optimization actions reducing the emissions amount more than expected amount. Said differently, for example, under the adjusted long-term emissions optimization plan the one or more assets may not have to take as intensive emissions reduction steps to still achieve net zero emissions by the net zero emissions date associated with the one or more assets.

As another example, the one or more long-term emissions optimization actions reduced the emissions amount less than the expected amount (e.g., the one or more assets may now be on track to achieve net zero emissions after the net zero emissions date associated with the one or more assets). In this regard, the adjusted long-term emissions optimization plan may include one or more adjusted long-term emissions optimization actions that accounts for the error in the long-term emissions optimization plan that resulted in the one or more long-term emissions optimization actions increasing the emissions amount more than expected amount. Said differently, for example, under the adjusted long-term emissions optimization plan the one or more assets may have to take more intensive emissions reduction steps to still achieve net zero emissions by the net zero emissions date associated with the one or more assets.

As described above, in some embodiments, the one or more errors in the long-term emissions optimization plan may occur when the long-term emissions optimization plan indicated that the one or more assets were on track to achieve net zero emissions after the net zero emissions date associated with the one or more assets (e.g., because the long-term emissions estimate indicated that the one or more assets will have greater than net zero emissions at the net zero emissions date associated with the one or more assets). In this regard, for example, the long-term emissions estimate in the long-term emissions optimization plan may have assumed that the one or more long-term emissions optimization actions (e.g., replacing a component of the one more assets with a more efficient component) would reduce the emissions amount of the one or more assets by an expected amount. However, the updated operational data (e.g., the updated short-term operational data and/or updated long-term operational data) may indicate that the one or more long-term emissions optimization actions did not reduce the emissions amount of the one or more assets in the long-term time period by the expected amount.

For example, the one or more long-term emissions optimization actions reduced the emissions amount more than expected amount (e.g., the one or more assets may now be on track to achieve net zero emissions before the net zero emissions date associated with the one or more assets). In this regard, the adjusted long-term emissions optimization plan may include one or more adjusted long-term emissions optimization actions that accounts for the error in the long-term emissions optimization plan that resulted in the one or more long-term emissions optimization actions reducing the emissions amount more than expected amount. Said differently, for example, under the adjusted long-term emissions optimization plan the one or more assets may not have to take as intensive emissions reduction steps to achieve net zero emissions by the net zero emissions date associated with the one or more assets.

As another example, the one or more long-term emissions optimization actions reduced the emissions amount less than the expected amount (e.g., the one or more assets may still be on track to achieve net zero emissions after the net zero emissions date associated with the one or more assets). In this regard, the adjusted long-term emissions optimization plan may include one or more adjusted long-term emissions optimization actions that accounts for the error in the long-term emissions optimization plan that resulted in the one or more long-term emissions optimization actions increasing the emissions amount more than expected amount. Said differently, for example, under the adjusted long-term emissions optimization plan the one or more assets may have to take more intensive emissions reduction steps to achieve net zero emissions by the net zero emissions date associated with the one or more assets.

As described above, in some embodiments, the one or more errors in the long-term emissions optimization plan may occur when the long-term emissions optimization plan indicated that the one or more assets were on track to achieve net zero emissions before the net zero emissions date associated with the one or more assets (e.g., because the long-term emissions estimate indicated that the one or more assets will have net zero emissions before the net zero emissions date associated with the one or more assets). In this regard, for example, the long-term emissions estimate in the long-term emissions optimization plan may have assumed that the one or more long-term emissions optimization actions (e.g., replacing a component of the one more assets with a more efficient component) would reduce the emissions amount of the one or more assets by an expected amount. However, the updated operational data (e.g., the updated short-term operational data and/or updated long-term operational data) may indicate that the one or more long-term emissions optimization actions did not reduce the emissions amount of the one or more assets in the long-term time period by the expected amount.

For example, the one or more long-term emissions optimization actions reduced the emissions amount more than expected amount (e.g., the one or more assets may still be on track to achieve net zero emissions before the net zero emissions date associated with the one or more assets). In this regard, the adjusted long-term emissions optimization plan may include one or more adjusted long-term emissions optimization actions that accounts for the error in the long-term emissions optimization plan that resulted in the one or more long-term emissions optimization actions reducing the emissions amount more than expected amount. Said differently, for example, under the adjusted long-term emissions optimization plan the one or more assets may not have to take as intensive emissions reduction steps to achieve net zero emissions by (or before) the net zero emissions date associated with the one or more assets.

As another example, the one or more long-term emissions optimization actions reduced the emissions amount less than the expected amount (e.g., the one or more assets may still on track to achieve net zero emissions before the net zero emissions date associated with the one or more assets). In this regard, the adjusted long-term emissions optimization plan may include one or more adjusted long-term emissions optimization actions that accounts for the error in the long-term emissions optimization plan that resulted in the one or more long-term emissions optimization actions increasing the emissions amount more than expected amount. Said differently, for example, under the adjusted long-term emissions optimization plan the one or more assets may be able to take less intensive emissions reduction steps and still achieve net zero emissions by (or before) the net zero emissions date associated with the one or more assets.

As described above, in some embodiments, the adjusted short-term emissions control may be based at least in part on one or more errors in the short-term emissions control. In some embodiments, the one or more errors in the short-term emissions control may occur when the short-term emissions control indicated that the short-term emissions estimate was approximately equal to the particular emissions amount necessary for the short-term time period in order for the one or more assets to achieve net zero emissions by the net zero emissions date associated with the one or more assets in accordance with the long-term emissions optimization plan. In this regard, for example, the short-term emissions estimate in the short-term emissions control may have assumed that the one or more short-term emissions control optimization actions cause the one or more assets to make no changes in emissions such that the one or more assets can meet the particular emissions amount necessary for the short-term time period. However, the updated operational data (e.g., the updated short-term operational data and/or updated long-term operational data) may indicate that the one or more short-term emissions control optimization actions did cause changes in the emissions such that the one or more assets can did not meet the particular emissions amount necessary for the short-term time period.

For example, the one or more short-term emissions control optimization actions may have caused the one or more assets to increase emissions such that the one or more assets had emissions greater than the particular emissions amount necessary for the short-term time period. In this regard, the adjusted short-term emissions control may include one or more adjusted short-term emissions control optimization actions that accounts for the error in the short-term emissions control that resulted in the one or more short-term emissions control optimization actions causing the one or more assets to increase emissions such that the one or more assets had emissions greater than the particular emissions amount necessary for the short-term time period.

As another example, the one or more short-term emissions control optimization actions may have caused the one or more assets to decrease emissions such that the one or more assets had emissions less than the particular emissions amount necessary for the short-term time period. In this regard, the adjusted short-term emissions control may include one or more adjusted short-term emissions control optimization actions that accounts for the error in the short-term emissions control that resulted in the one or more short-term emissions control optimization actions causing the one or more assets to decrease emissions such that the one or more assets had emissions less than the particular emissions amount necessary for the short-term time period.

As described above, in some embodiments, the one or more errors in the short-term emissions control may occur when the short-term emissions control indicated that the short-term emissions estimate was greater than the particular emissions amount necessary for the short-term time period in order for the one or more assets to achieve net zero emissions by the net zero emissions date associated with the one or more assets in accordance with the long-term emissions optimization plan. In this regard, for example, the short-term emissions estimate in the short-term emissions control may have assumed that the one or more short-term emissions control optimization actions cause the one or more assets to reduce emissions by an expected amount such that the one or more assets can meet the particular emissions amount necessary for the short-term time period. However, the updated operational data (e.g., the updated short-term operational data and/or updated long-term operational data) may indicate that the one or more short-term emissions control optimization actions did not reduce emissions by the expected amount such that the one or more assets did not meet the particular emissions amount necessary for the short-term time period.

For example, the one or more short-term emissions control optimization actions may have caused the one or more assets to reduce emissions by less than the expected amount such that the one or more assets had emissions greater than the particular emissions amount necessary for the short-term time period. In this regard, the adjusted short-term emissions control may include one or more adjusted short-term emissions control optimization actions that accounts for the error in the short-term emissions control that resulted in the one or more short-term emissions control optimization actions causing the one or more assets to reduce emissions less than the expected amount such that the one or more assets had emissions greater than the particular emissions amount necessary for the short-term time period.

As another example, the one or more short-term emissions control optimization actions may have caused the one or more assets to decrease emissions by more than the expected amount such that the one or more assets had emissions less than the particular emissions amount necessary for the short-term time period. In this regard, the adjusted short-term emissions control may include one or more adjusted short-term emissions control optimization actions that accounts for the error in the short-term emissions control that resulted in the one or more short-term emissions control optimization actions causing the one or more assets to decrease emissions more than the expected amount such that the one or more assets had emissions less than the particular emissions amount necessary for the short-term time period.

As described above, in some embodiments, the one or more errors in the short-term emissions control may occur when the short-term emissions control indicated that the short-term emissions estimate was less than the particular emissions amount necessary for the short-term time period in order for the one or more assets to achieve net zero emissions by the net zero emissions date associated with the one or more assets in accordance with the long-term emissions optimization plan. In this regard, for example, the short-term emissions estimate in the short-term emissions control may have assumed that the one or more short-term emissions control optimization actions cause the one or more assets to increase emissions (e.g., if increasing emissions reduces costs) by an expected amount such that the one or more assets can meet the particular emissions amount necessary for the short-term time period. However, the updated operational data (e.g., the updated short-term operational data and/or updated long-term operational data) may indicate that the one or more short-term emissions control optimization actions did not increase emissions by the expected amount such that the one or more assets did not meet the particular emissions amount necessary for the short-term time period.

For example, the one or more short-term emissions control optimization actions may have caused the one or more assets to increase emissions by less than the expected amount such that the one or more assets had emissions less than the particular emissions amount necessary for the short-term time period. In this regard, the adjusted short-term emissions control may include one or more adjusted short-term emissions control optimization actions that accounts for the error in the short-term emissions control that resulted in the one or more short-term emissions control optimization actions causing the one or more assets to increase emissions less than the expected amount such that the one or more assets had emissions less than the particular emissions amount necessary for the short-term time period.

As another example, the one or more short-term emissions control optimization actions may have caused the one or more assets to increase emissions by more than the expected amount such that the one or more assets had emissions greater than the particular emissions amount necessary for the short-term time period. In this regard, the adjusted short-term emissions control may include one or more adjusted short-term emissions control optimization actions that accounts for the error in the short-term emissions control that resulted in the one or more short-term emissions control optimization actions causing the one or more assets to increase emissions more than the expected amount such that the one or more assets had emissions greater than the particular emissions amount necessary for the short-term time period.

As described above, in some embodiments, the one or more errors in the short-term emissions control may occur when the short-term emissions control indicated that the short-term emissions estimate was less than the particular emissions amount necessary for the short-term time period in order for the one or more assets to achieve net zero emissions by the net zero emissions date associated with the one or more assets in accordance with the long-term emissions optimization plan. In this regard, for example, the short-term emissions estimate in the short-term emissions control may have assumed that the one or more short-term emissions control optimization actions cause the one or more assets to make no changes in emissions such that the one or more assets can meet (or be less than) the particular emissions amount necessary for the short-term time period. However, the updated operational data (e.g., the updated short-term operational data and/or updated long-term operational data) may indicate that the one or more short-term emissions control optimization actions did cause changes in the emissions such that the one or more assets did not meet the particular emissions amount necessary for the short-term time period.

For example, the one or more short-term emissions control optimization actions may have caused the one or more assets to increase emissions such that the one or more assets had emissions greater than the particular emissions amount necessary for the short-term time period. In this regard, the adjusted short-term emissions control may include one or more adjusted short-term emissions control optimization actions that accounts for the error in the short-term emissions control that resulted in the one or more short-term emissions control optimization actions causing the one or more assets to increase emissions such that the one or more assets had emissions greater than the particular emissions amount necessary for the short-term time period.

As another example, the one or more short-term emissions control optimization actions may have caused the one or more assets to decrease emissions such that the one or more assets had emissions less than the particular emissions amount necessary for the short-term time period. In this regard, the adjusted short-term emissions control may include one or more adjusted short-term emissions control optimization actions that accounts for the error in the short-term emissions control that resulted in the one or more short-term emissions control optimization actions causing the one or more assets to decrease emissions such that the one or more assets had emissions less than the particular emissions amount necessary for the short-term time period.

As described above, in some embodiments, the adjusted long-term emissions optimization plan may be based at least in part on one or more errors in the short-term emissions control. For example, the short-term emissions estimate generated by the short-term emissions control may be incorrect (e.g., due to errors in operational data, such as short-term operational data and/or long-term operational data). In this regard, for example, the one or more short-term emissions control optimization actions implemented by the one or more assets may have caused the one or more assets to not meet the particular emissions amount necessary for the short-term time period in order for the one or more assets to achieve net zero emissions by the net zero emissions data associated with the one or more assets. Accordingly, the adjusted long-term emissions optimization plan may account for the fact that the one or more assets did not adhere to the long-term emissions optimization plan due to the one or more errors in the short-term emissions control.

As described above, in some embodiments, the adjusted short-term emissions control may be based at least in part on one or more errors in the long-term emissions optimization plan. For example, the long-term emissions optimization plan may have caused a short-term emissions control to be generated that results in a particular emissions amount for the one or more assets in the short-term time period. However, the particular emissions amount for the one or more assets in the short-term time period may be unattainable by the one or more assets in the short-term time period (e.g., the particular emissions amount was caused by one or more errors in the operational data and/or the optimization model used to generate the long-term emissions optimization plan). In this regard, for example, the one or more assets may not adhere to the short-term emissions control. Accordingly, the adjusted short-term emissions control may account for the fact that the one or more assets did not adhere to the short-term emissions control due to the one or more errors in the long-term emissions optimization plan.

As described above, in some embodiments, the adjusted long-term emissions optimization plan and/or the adjusted short-term emissions control may be outputted to a user interface.

As described above, in some embodiments, new adjusted long-term emissions optimization plans and/or new adjusted short-term emissions controls may be regularly generated. In this regard, for example, feedback may be regularly incorporated into the new adjusted long-term emissions optimization plans and/or new adjusted short-term emissions controls based on the success of previous iterations of the long-term emissions optimization plan, adjusted long-term emissions optimization plan, short-term emissions control, and/or adjusted short-term emissions control (e.g., whether or not there are errors in the long-term emissions optimization plan, adjusted long-term emissions optimization plan, short-term emissions control, and/or adjusted short-term emissions control). For example, new adjusted long-term emissions optimization plans and/or new adjusted short-term emissions controls may be generated on a periodic basis, such as once per hour, once per day, once per week, once per month, once per quarter, etc. Additionally or alternatively, new adjusted long-term emissions optimization plans and/or new adjusted short-term emissions controls may be generated each time new operational data associated with the one or more assets is received. Additionally or alternatively new adjusted long-term emissions optimization plans and/or new adjusted short-term emissions controls may be generated in response to a user instruction, such as a user selecting the update component on the user interface.

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this specification contains many specific embodiment and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are illustrated in the drawings in a particular order, this should not be understood as requiring that such operations be performed in the particular order shown or in sequential order, or that all illustrated operations be performed, to achieve desirable results. In certain circumstances, operations in alternative ordering may be advantageous. In some cases, the actions recited in the claims may be performed in a different order and still achieve desirable results.

That which is claimed:

1. A computer-implemented method for constrained emissions control, emissions optimization, and emissions planning, the computer-implemented method comprising:
    receiving operational data associated with one or more assets, wherein the operational data comprises short-term operational data and long-term operational data;
    generating, based at least in part on applying the short-term operational data and the long-term operational data to an optimization model, a long-term emissions optimization plan;
    generating, based at least in part on the long-term emissions optimization plan, a short-term emissions control; and
    initiating performance of one or more emissions optimization actions based at least in part on the long-term emissions optimization plan or the short-term emissions control.

2. The computer-implemented method of claim 1, further comprising:
    receiving updated operational data associated with one or more assets, wherein the updated operational data comprises updated short-term operational data and updated long-term operational data;
    generating, based at least in part on applying the updated short-term operational data and the updated long-term operational data to the optimization model, an adjusted long-term emissions optimization plan;
    generating, based at least in part on the adjusted long-term emissions optimization plan, an adjusted short-term emissions control; and
    initiating performance of one or more adjusted emissions optimization actions based at least in part on the adjusted long-term emissions optimization plan or the adjusted short-term emissions control.

3. The computer-implemented method of claim 2, wherein the updated operational data is received after the performance of the one or more emissions optimization actions.

4. The computer-implemented method of claim 2, wherein the long-term emissions optimization plan comprises a long-term emissions estimate and the short-term emissions control comprises a short-term emissions estimate.

5. The computer-implemented method of claim 4, wherein the adjusted long-term emissions optimization plan is based at least in part on one or more errors in the long-term emissions optimization plan.

6. The computer-implemented method of claim 4, wherein the adjusted short-term emissions control is based at least in part on one or more errors the short-term emissions control.

7. The computer-implemented method of claim 1, wherein the one or more emissions optimization actions comprise at least one short-term emissions control optimization actions and at least one long-term emissions optimization actions.

8. The computer-implemented method of claim 7, wherein the at least one short-term emissions control optimization actions comprise at least one control optimization actions that is implemented within a short-term time period and the at least one long-term emissions optimization actions includes at least one optimization actions that is implemented within a long-term time period.

9. The computer-implemented method of claim 8, wherein the long-term time period is greater than the short-term time period.

10. The computer-implemented method of claim 1, wherein the one or more assets include at least one building and at least one plant.

11. The computer-implemented method of claim 1, wherein the operational data is received in real-time.

12. The computer-implemented method of claim 1, wherein the optimization model comprises a statistical model, an algorithmic model, a control systems model, or a machine learning model.

13. The computer-implemented method of claim 1, wherein the optimization model utilizes model predictive control.

14. The computer-implemented method of claim 1, wherein the optimization model utilizes proportional-integral-derivative control.

15. An apparatus for constrained emissions control, emissions optimization, and emissions planning, the apparatus comprising at least one processor and at least one non-transitory memory including computer-coded instructions thereon, the computer coded instructions, with the at least one processor, cause the apparatus to:
    receive operational data associated with one or more assets, wherein the operational data comprises short-term operational data and long-term operational data;
    generate, based at least in part on applying the short-term operational data and the long-term operational data to an optimization model, a long-term emissions optimization plan;
    generate, based at least in part on the long-term emissions optimization plan, a short-term emissions control; and
    initiate the performance of one or more emissions optimization actions based at least in part on the long-term emissions optimization plan or the short-term emissions control.

16. The apparatus of claim 15, wherein the computer coded instructions, further with the at least one processor, cause the apparatus to:
    receive updated operational data associated with one or more assets, wherein the updated operational data comprises updated short-term operational data and updated long-term operational data;
    generate, based at least in part on applying the updated short-term operational data and the updated long-term operational data to the optimization model, an adjusted long-term emissions optimization plan;
    generate, based at least in part on the adjusted long-term emissions optimization plan, an adjusted short-term emissions control; and initiate the performance of one or more adjusted emissions optimization actions based at least in part on the adjusted long-term emissions optimization plan or the adjusted short-term emissions control.

17. The apparatus of claim 16, wherein the long-term emissions optimization plan comprises a long-term emissions estimate and the short-term emissions control comprises a short-term emissions estimate.

18. The apparatus of claim 17, wherein the adjusted long-term emissions optimization plan is based at least in part on one or more errors in the long-term emissions optimization plan.

19. The apparatus of claim 17, wherein the adjusted short-term emissions control is based at least in part on one or more errors the short-term emissions control.

20. A non-transitory computer-readable device having instructions stored thereon that, when executed by at least one processor, cause the at least one processor to perform operations comprising:
   receiving operational data associated with one or more assets, wherein the operational data comprises short-term operational data and long-term operational data;
   generating, based at least in part on applying the short-term operational data and the long-term operational data to an optimization model, a long-term emissions optimization plan;
   generating, based at least in part on the long-term emissions optimization plan, a short-term emissions control; and
   initiating performance of one or more emissions optimization actions based at least in part on the long-term emissions optimization plan or the short-term emissions control.

* * * * *